Figure 1:
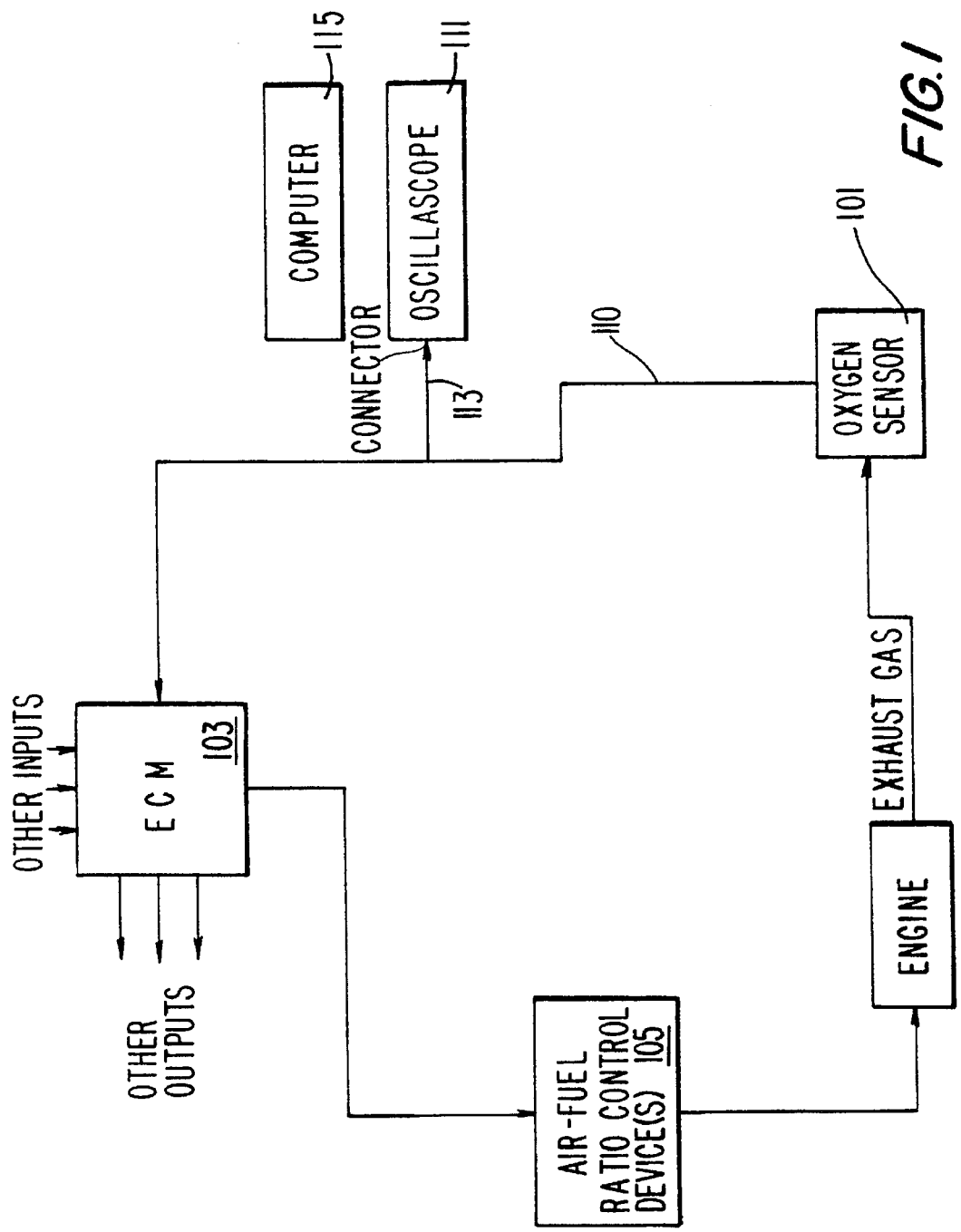

United States Patent [19]
Heuston et al.

[11] Patent Number: 5,585,552
[45] Date of Patent: Dec. 17, 1996

[54] METHOD AND APPARATUS FOR DIAGNOSING AUTOMOTIVE ENGINE PROBLEMS USING OXYGEN

[75] Inventors: Paul T. Heuston, Houston; Peter J. Sullivan, Kingwood; John E. A. Fison, Houston, all of Tex.

[73] Assignee: The Technician's Company, Kingwood, Tex.

[21] Appl. No.: 553,818

[22] Filed: Nov. 6, 1995

Related U.S. Application Data

[63] Continuation of Ser. No. 457,806, Jun. 1, 1995, abandoned, which is a continuation of Ser. No. 266,166, Jun. 27, 1994, abandoned, and Ser. No. 973,792, Nov. 9, 1992, abandoned.

[51] Int. Cl.$^6$ ................................................. G01M 15/00
[52] U.S. Cl. ............................................................. 73/116
[58] Field of Search ................................... 73/116, 117.2, 73/118.1

[56] References Cited

U.S. PATENT DOCUMENTS

| | | | |
|---|---|---|---|
| 4,567,756 | 2/1986 | Colborn | 73/118.1 |
| 4,691,562 | 9/1987 | Abthoff et al. | 73/118.1 |
| 4,961,341 | 10/1990 | Tanaka et al. | 73/118.1 |
| 5,228,335 | 7/1993 | Clemmens et al. | 73/118.1 |

*Primary Examiner*—Robert Raevis
*Attorney, Agent, or Firm*—Levisohn, Lerner, Berger & Langsam

[57] ABSTRACT

A novel method in accordance with the invention for generating diagnostic signals for power plants (e.g., automobile engines and other internal combustion engines, gas turbines, and the like) utilizes a digital storage lab oscilloscope (DSO), configured to display at least about five seconds of data at about at least 50 data points per second, to capture specific power plant information primarily from an oxygen sensor. A preliminary waveform analysis verifies that the oxygen sensor is functioning correctly. Then, the oxygen-sensor waveform is classified as to certain primary characteristics to produce gross-level diagnostic information. If necessary, the injector waveform can be used to further classify system or mechanical malfunctions. More specific diagnostic information is obtained by classifying certain secondary characteristics of the waveform. In some embodiments a portable DSO may be used to provide a low-cost way for a technician to connect the scope to a vehicle and actually drive the vehicle under varying conditions, thus increasing the chances of detecting and diagnosing intermittent problems. Such an approach is both more convenient and more economical than the use of expensive treadmill-type chassis dynamometers. The portability of the DSO also permits technicians to take the test equipment to various cars located in different repair bays instead of moving cars around to a fixed test instrument. In another aspect of the invention, a portable computer is used to digitize store, and display reference information, notably model waveforms for various types of oxygen sensors and other components. In still another aspect, a computer (portable or otherwise) can be used for automatic analysis and classification of individual engine waveforms.

22 Claims, 29 Drawing Sheets

*FIG.4A*
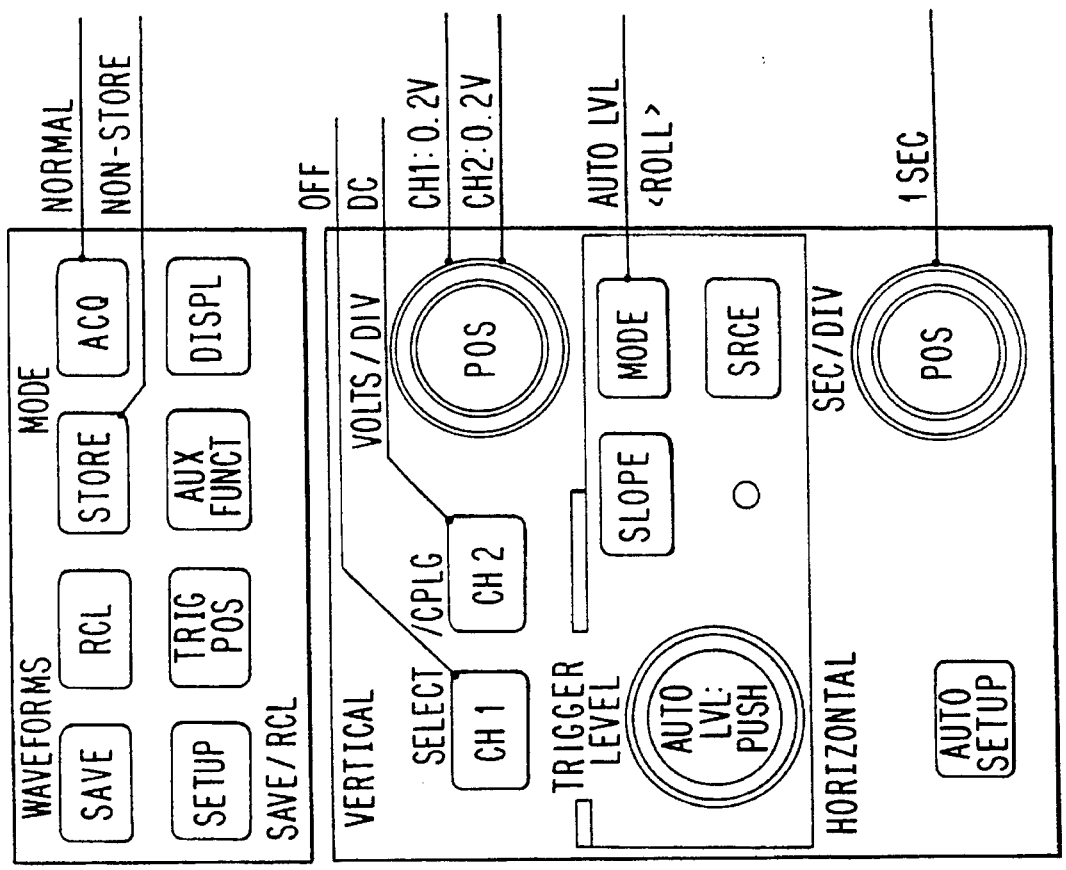
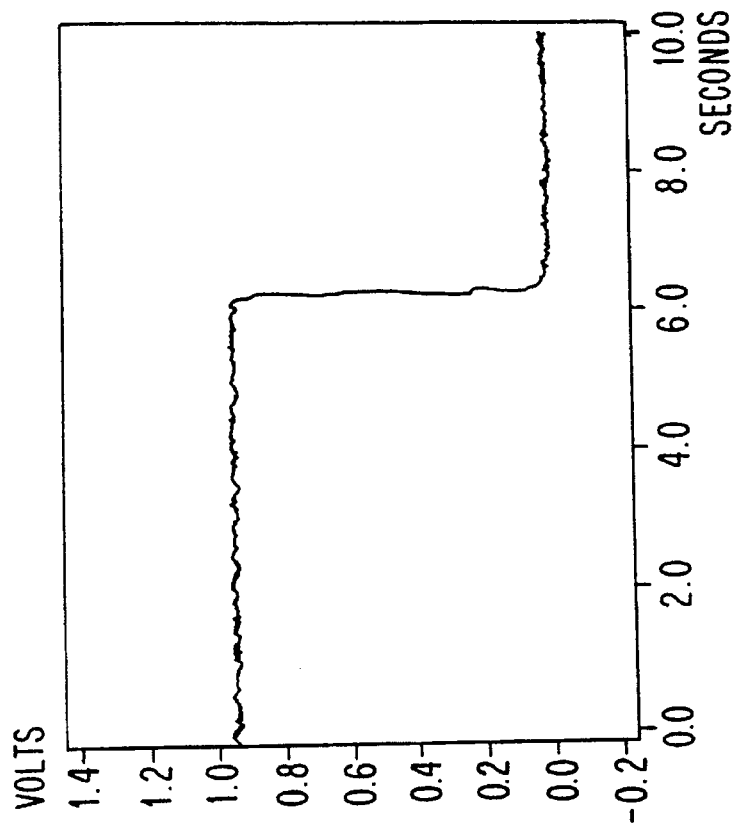

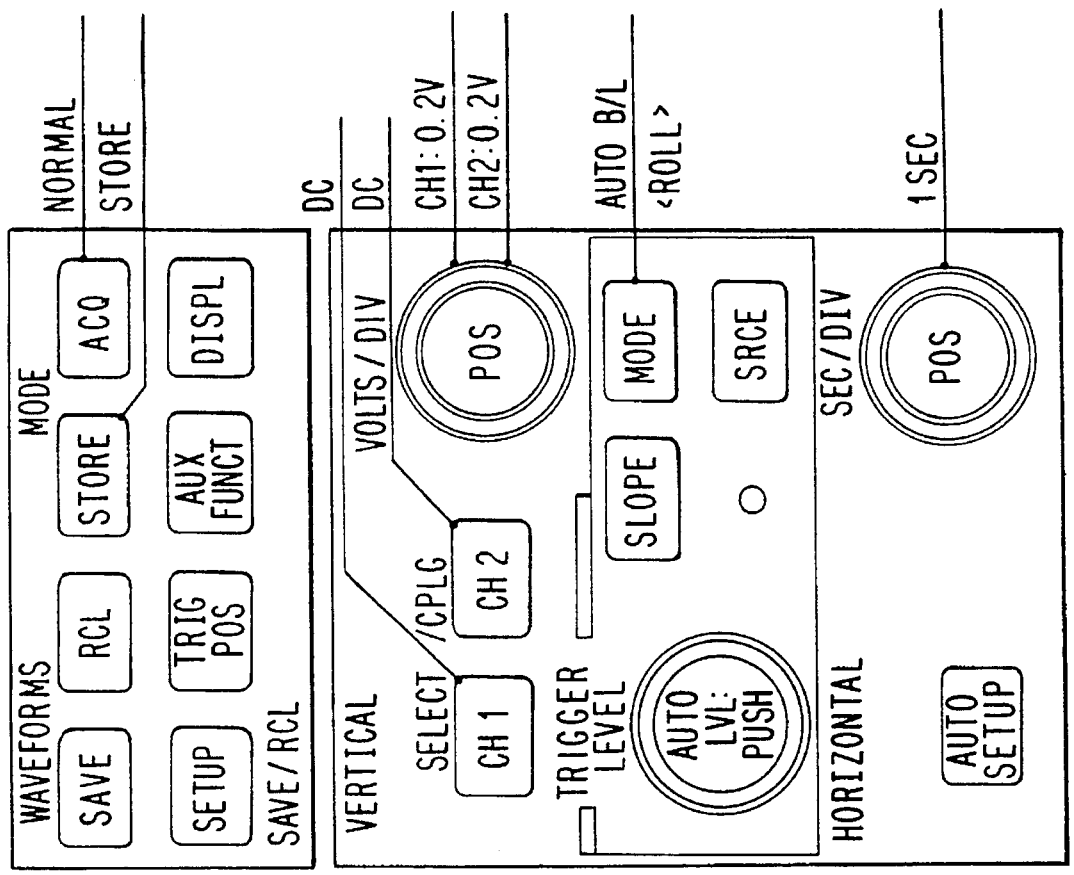
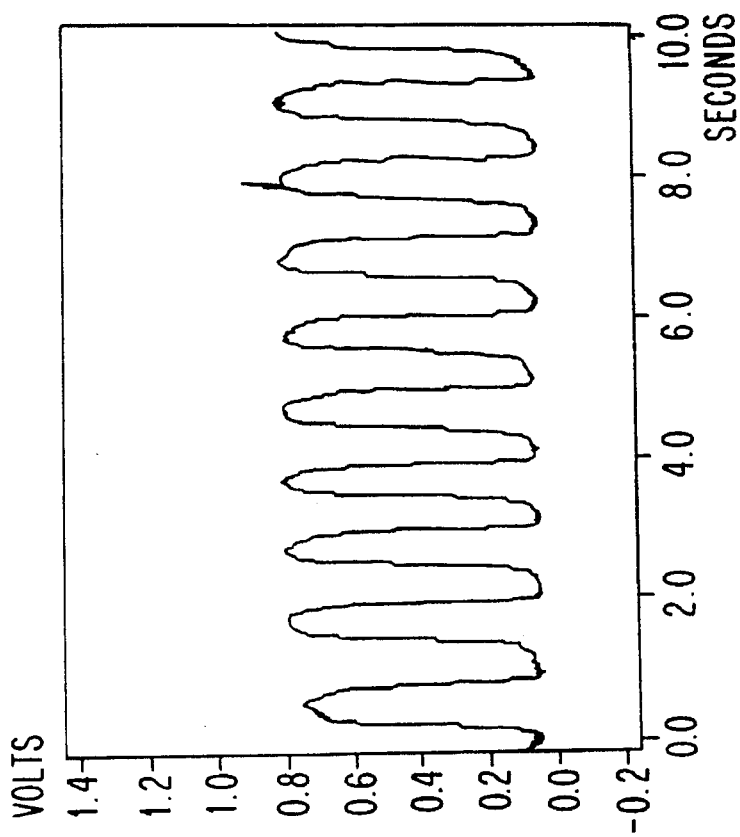
FIG. 5

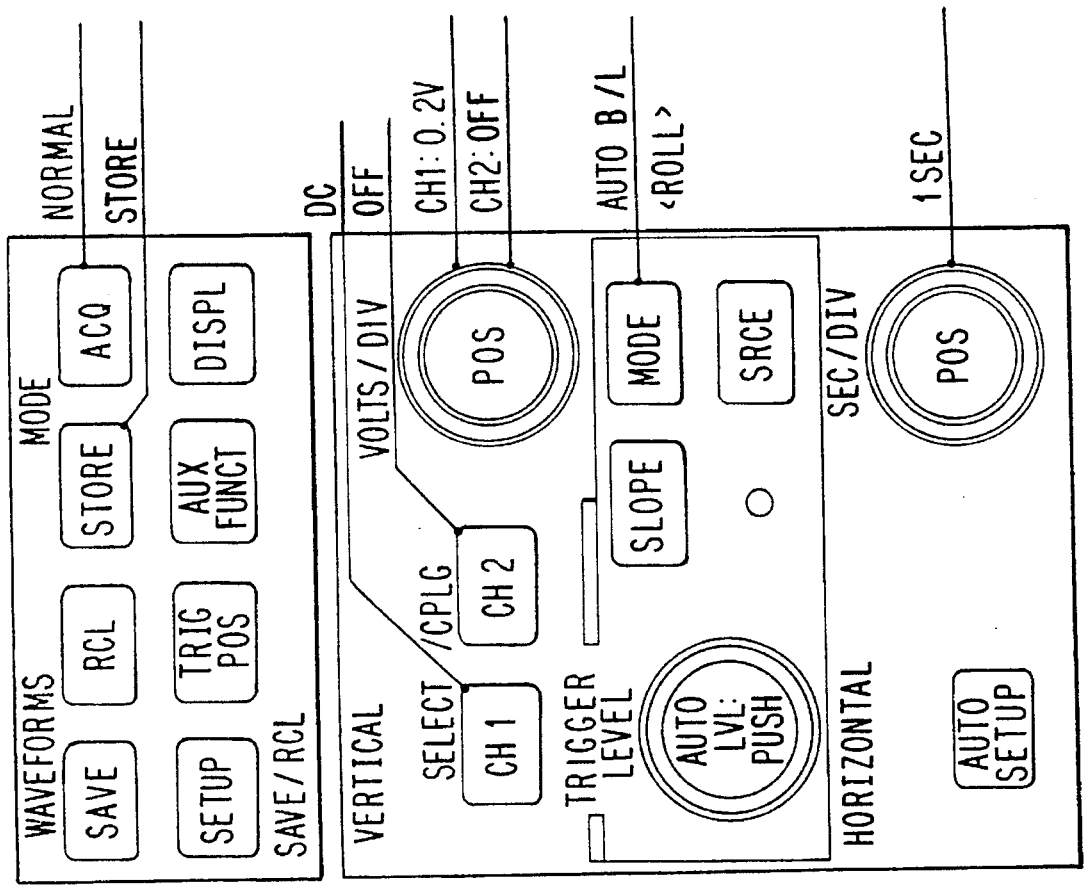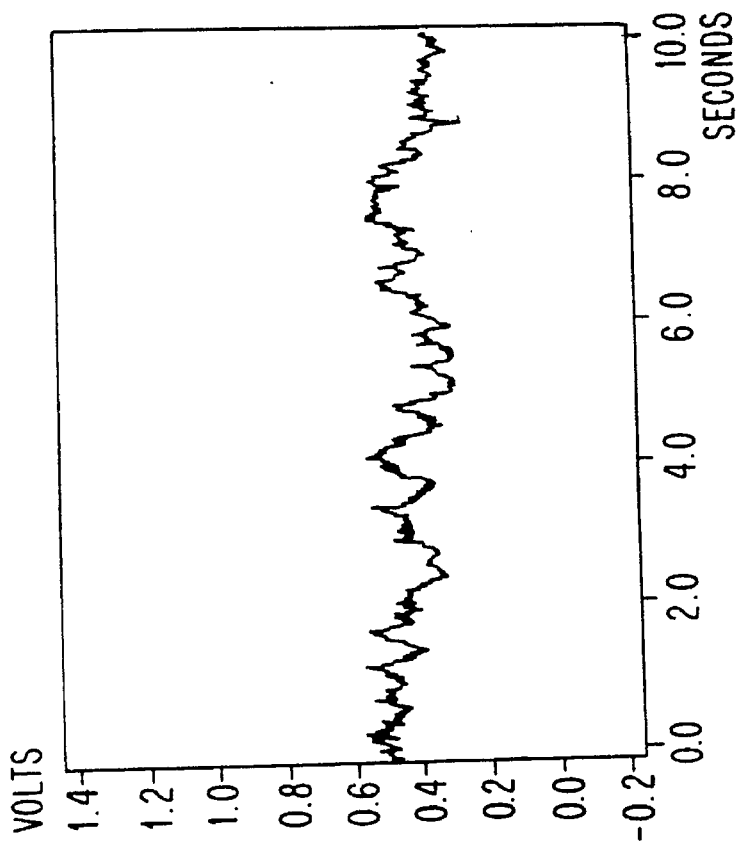
FIG.6

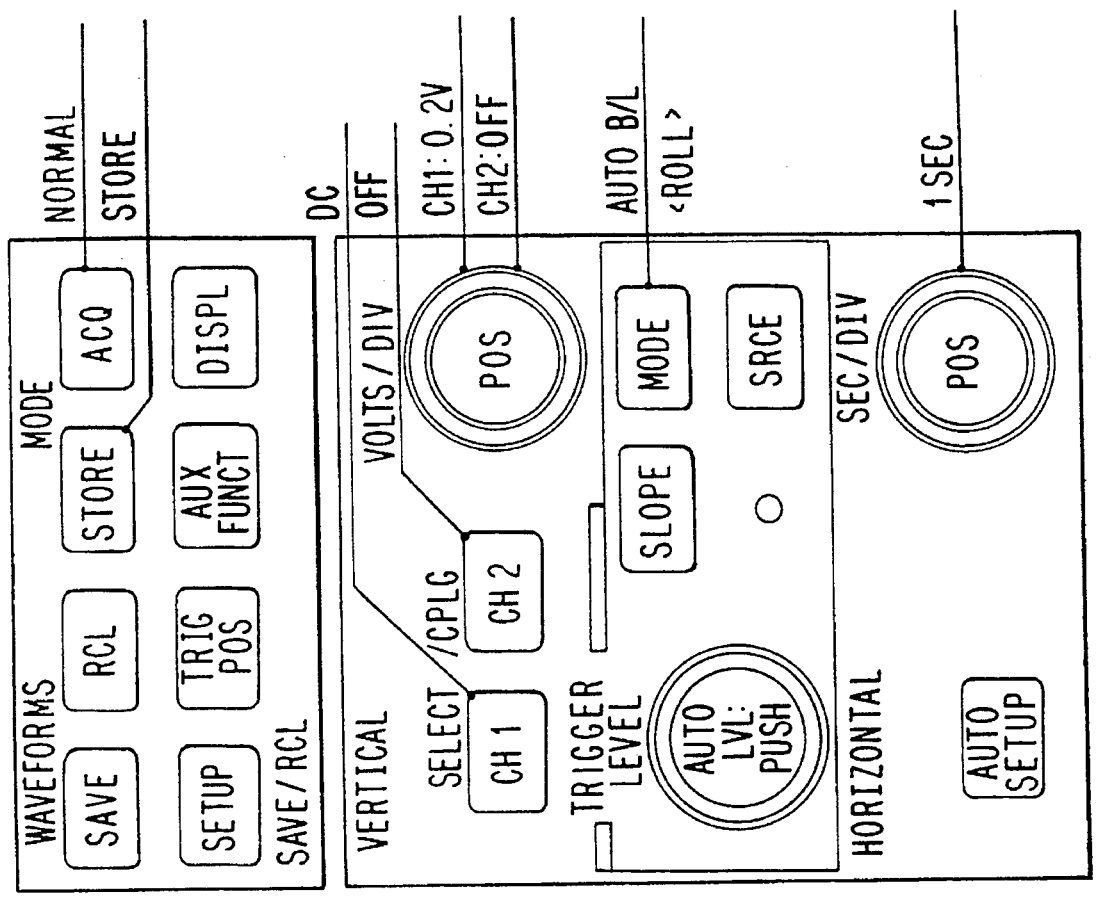
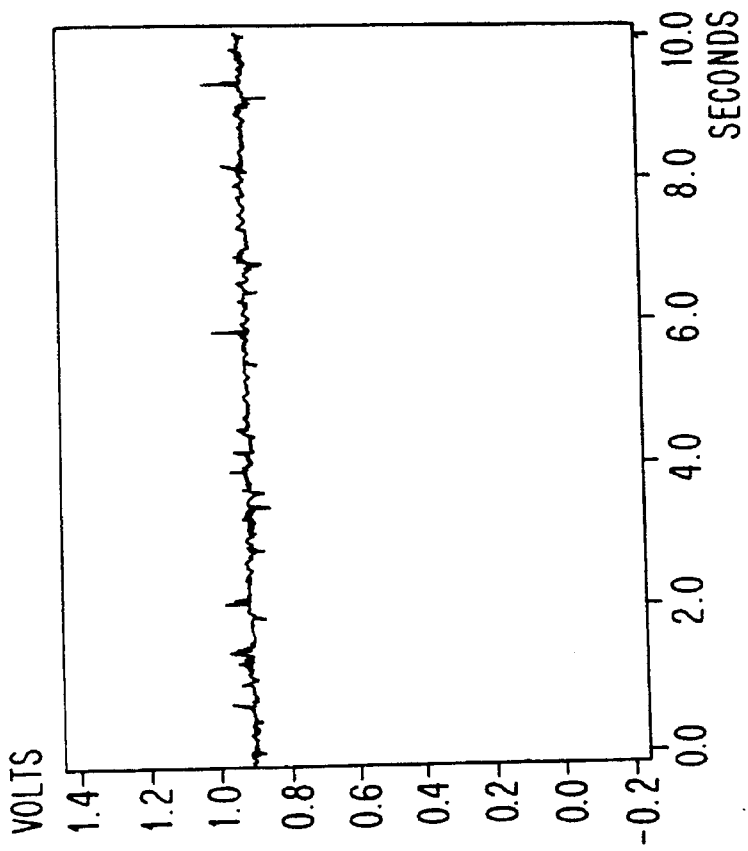
FIG. 7

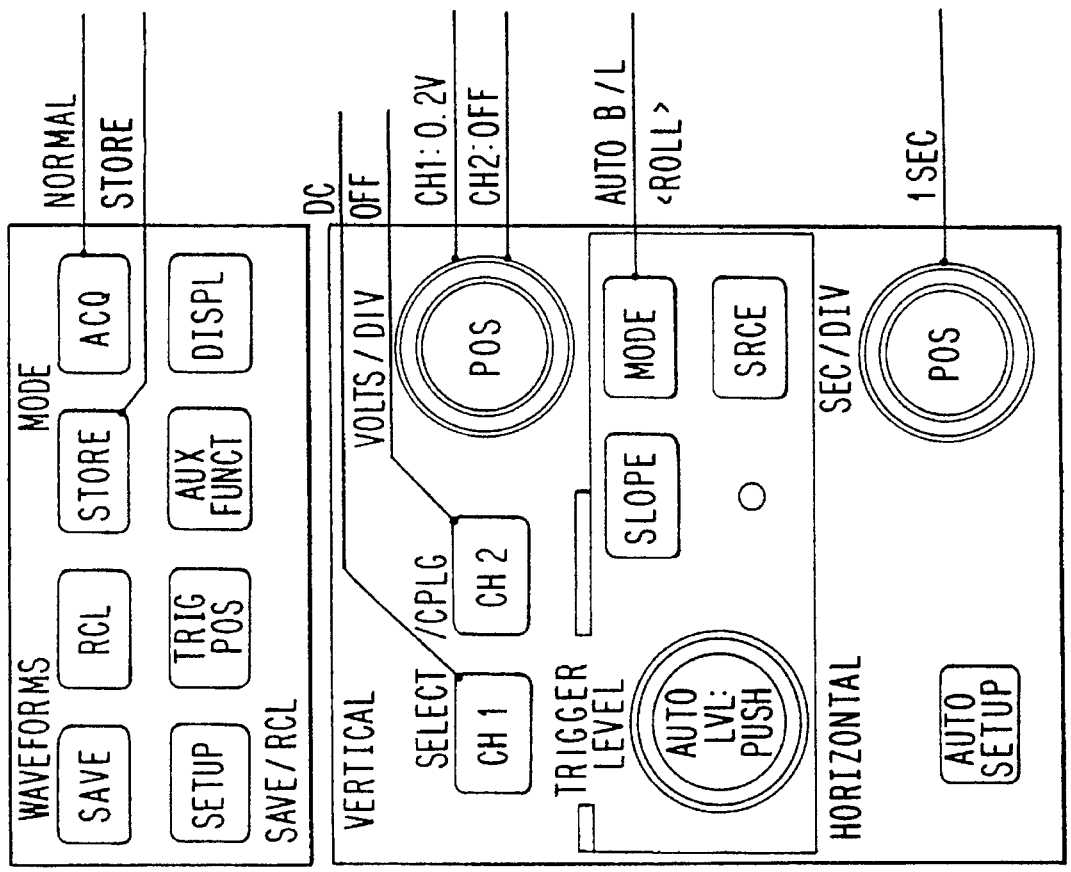
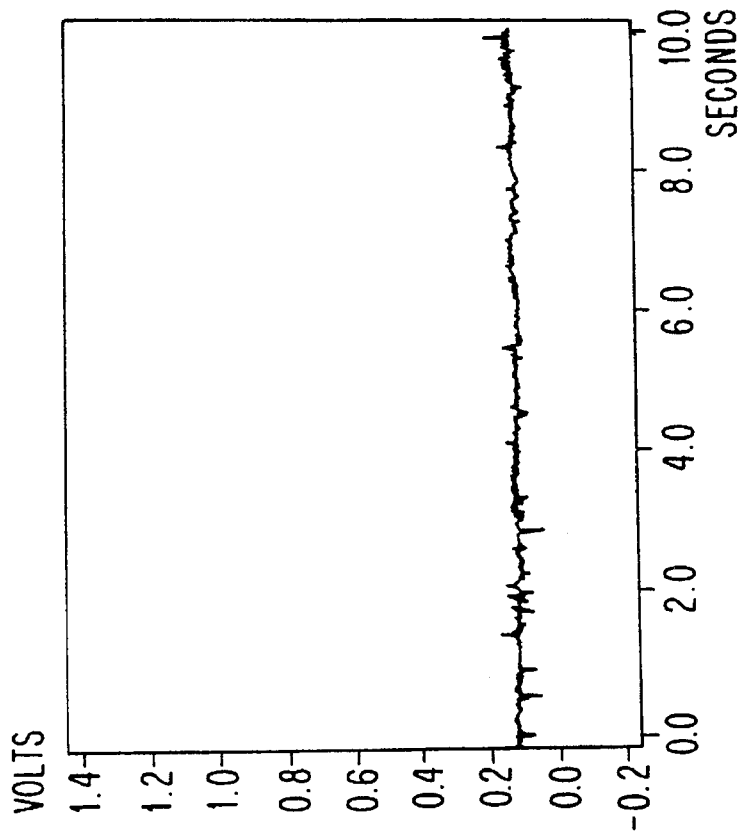
FIG.8

FIG.9
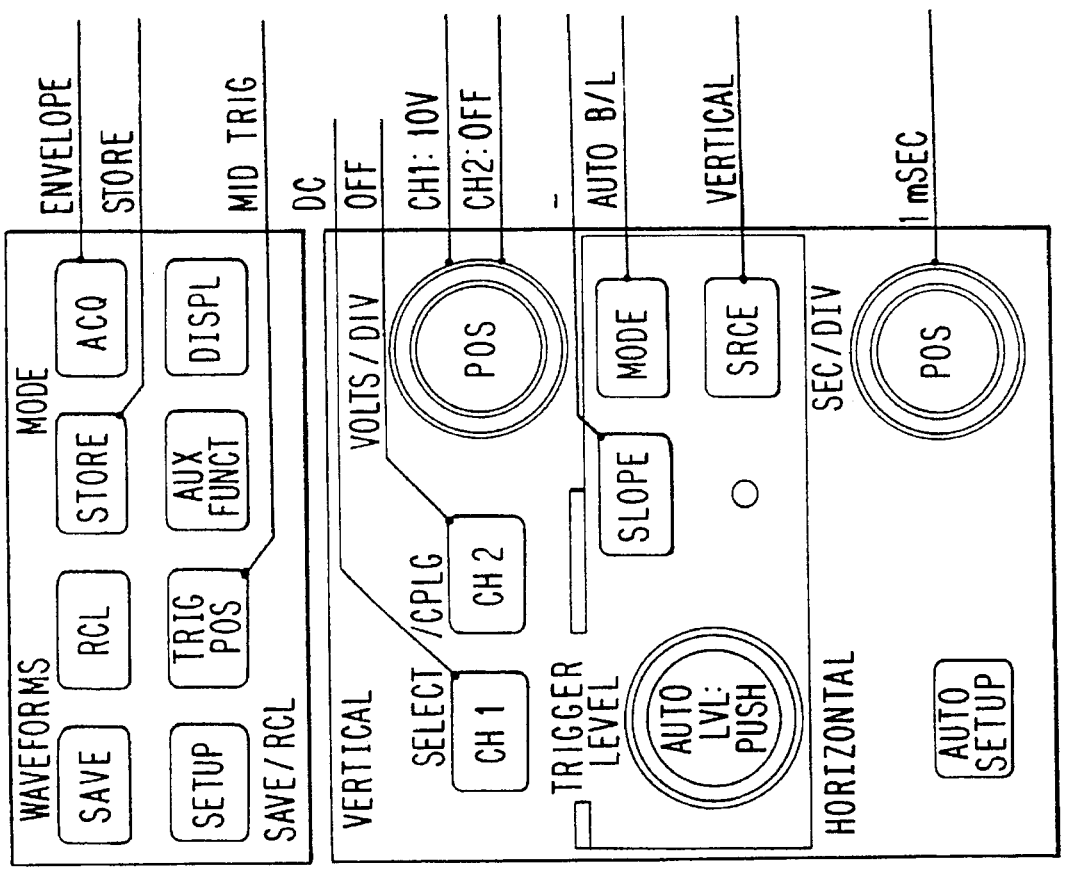
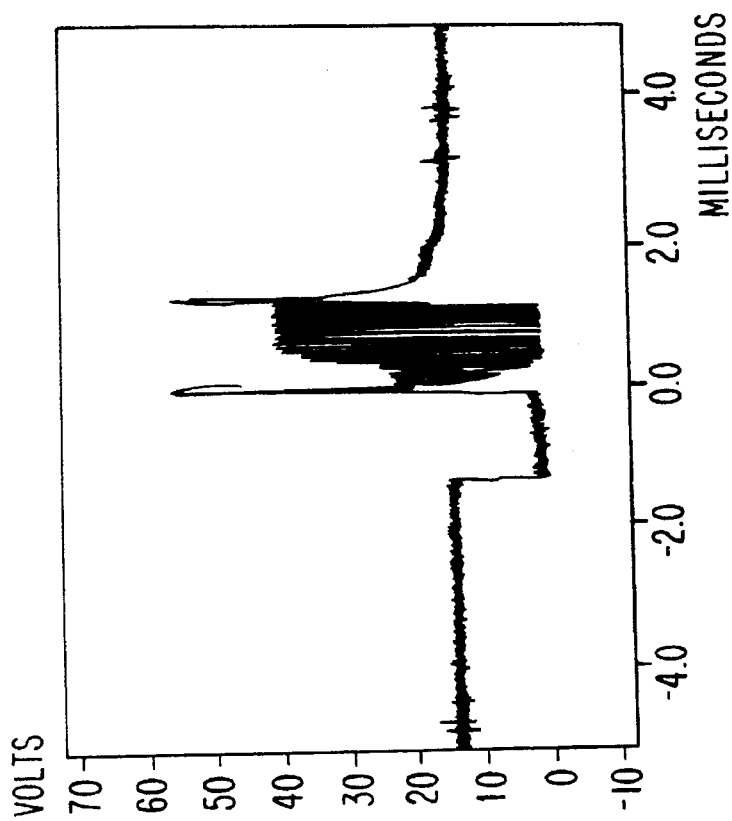

FIG. 10
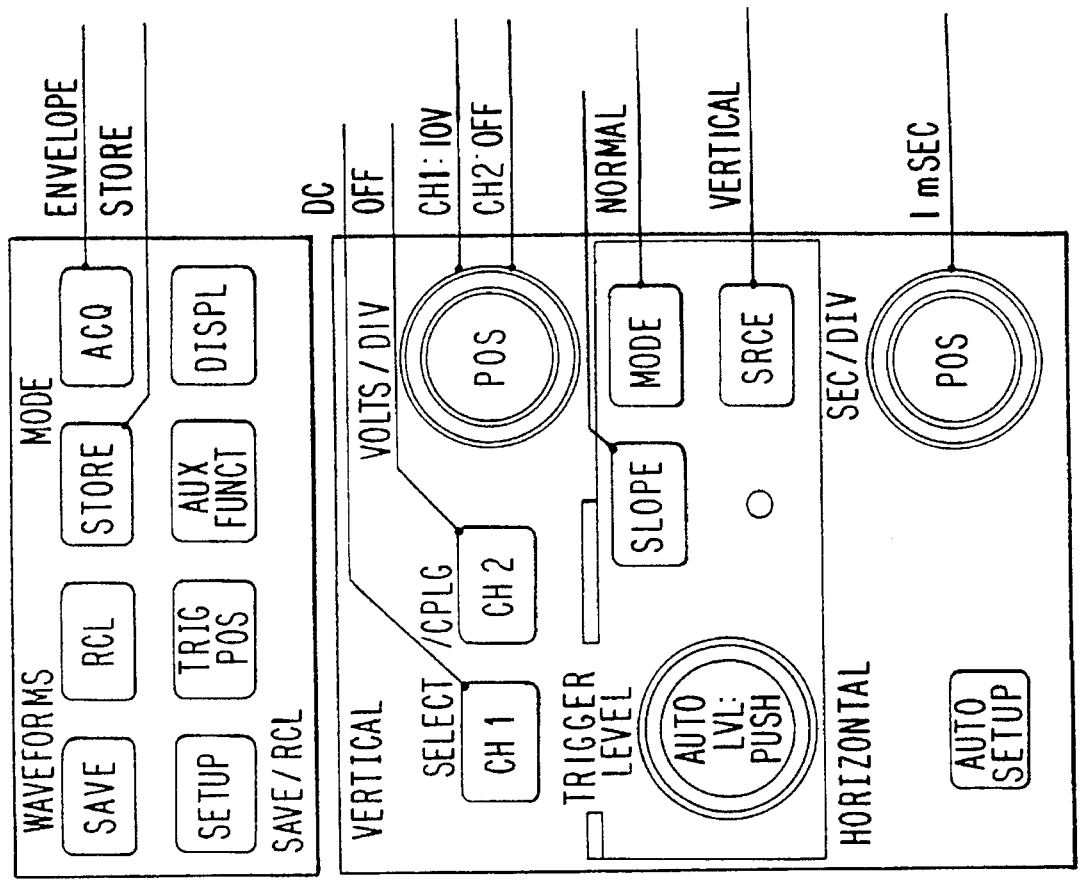
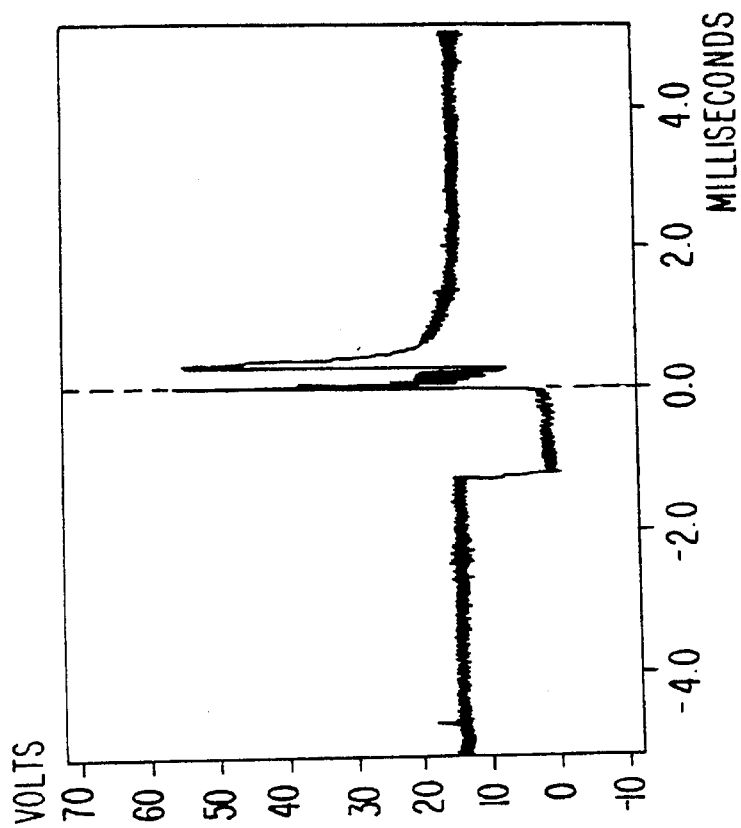

FIG. 11

|  | Predominantly Rich Mixture | Predominantly Lean Mixture |
|---|---|---|
| Lean Command | Mechanical problem, e.g., excess fuel supply | Spurious input to ECM or failed ECM |
| Rich Command | Spurious input to ECM or failed ECM | Mechanical problem, e.g., insufficient fuel supply |

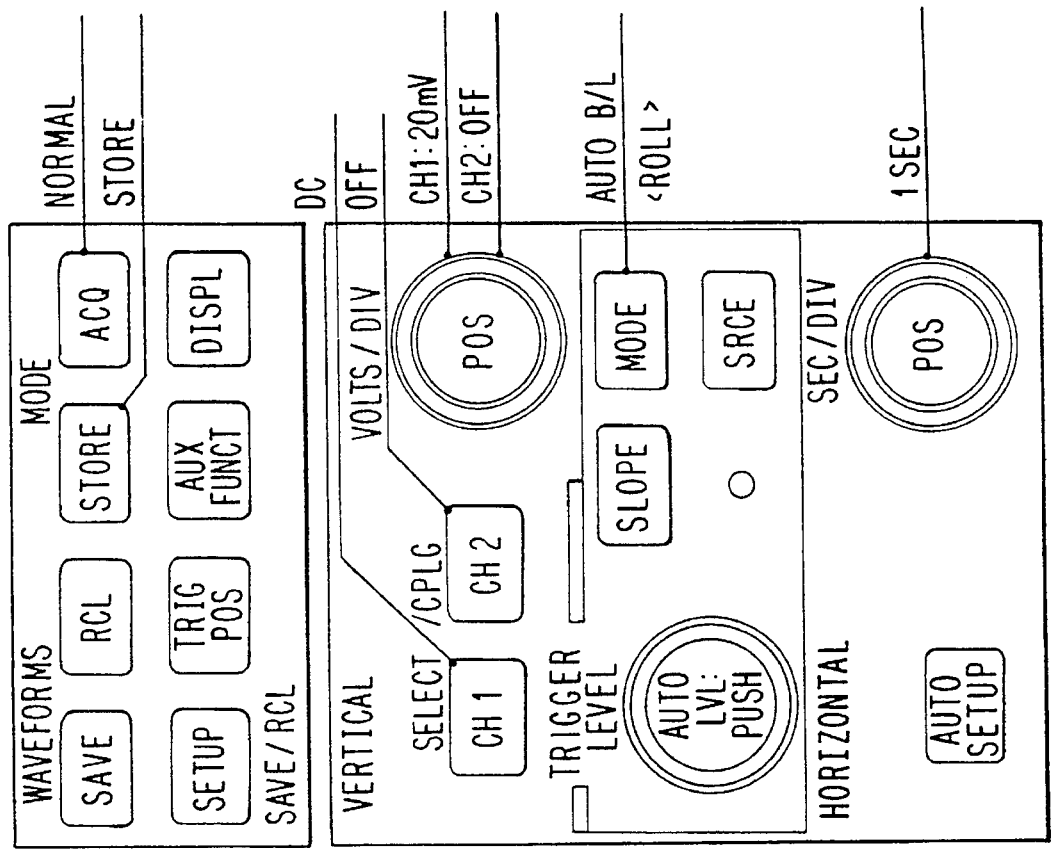
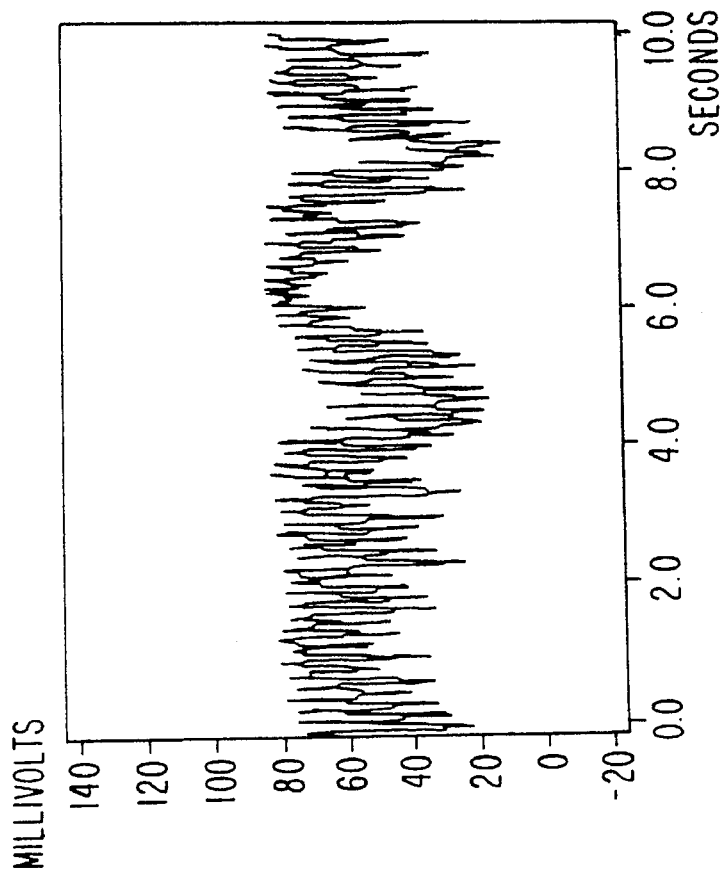
FIG. 12

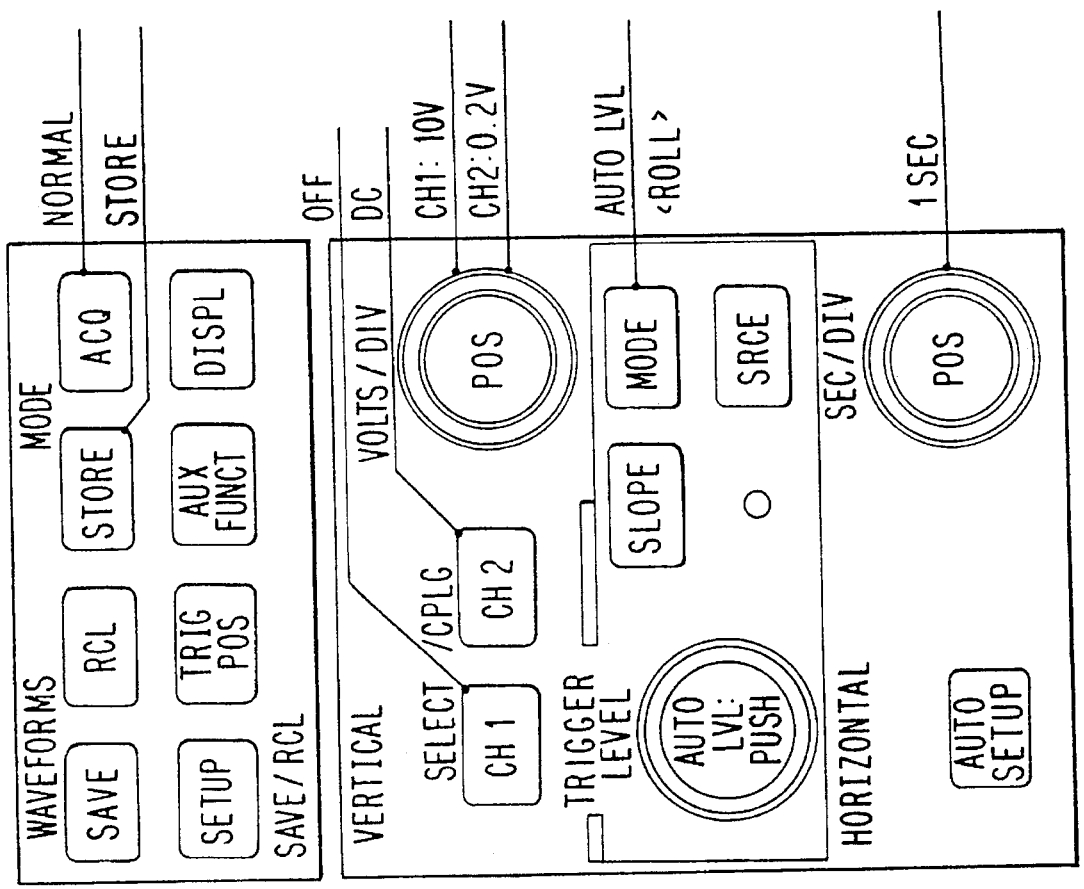
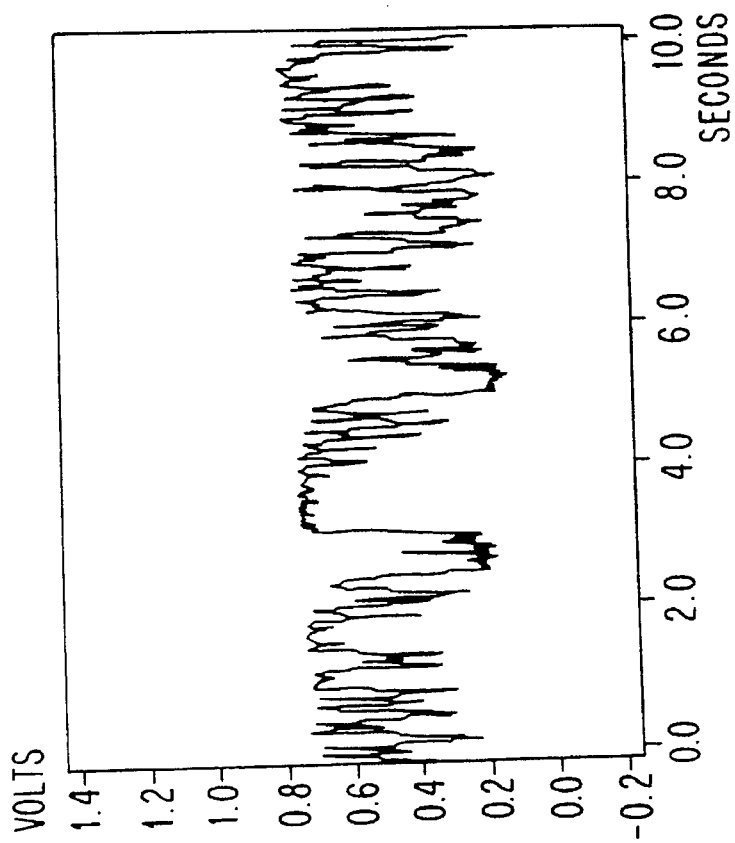
FIG. 13

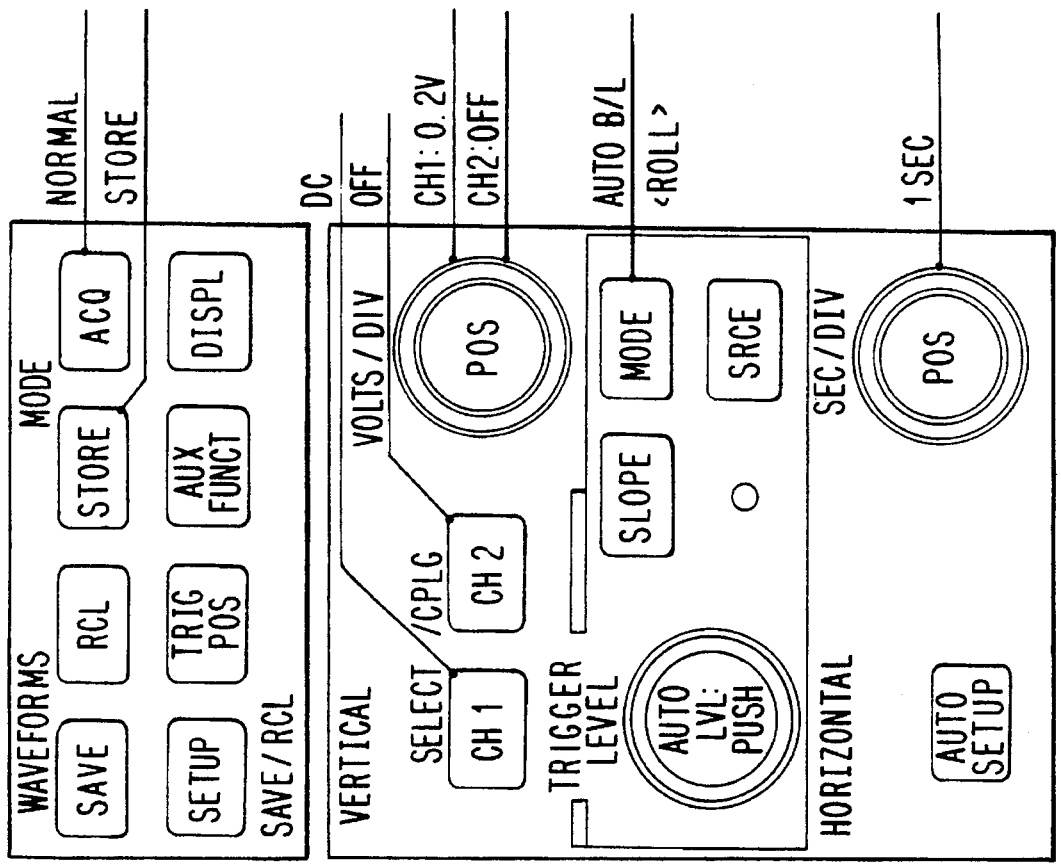
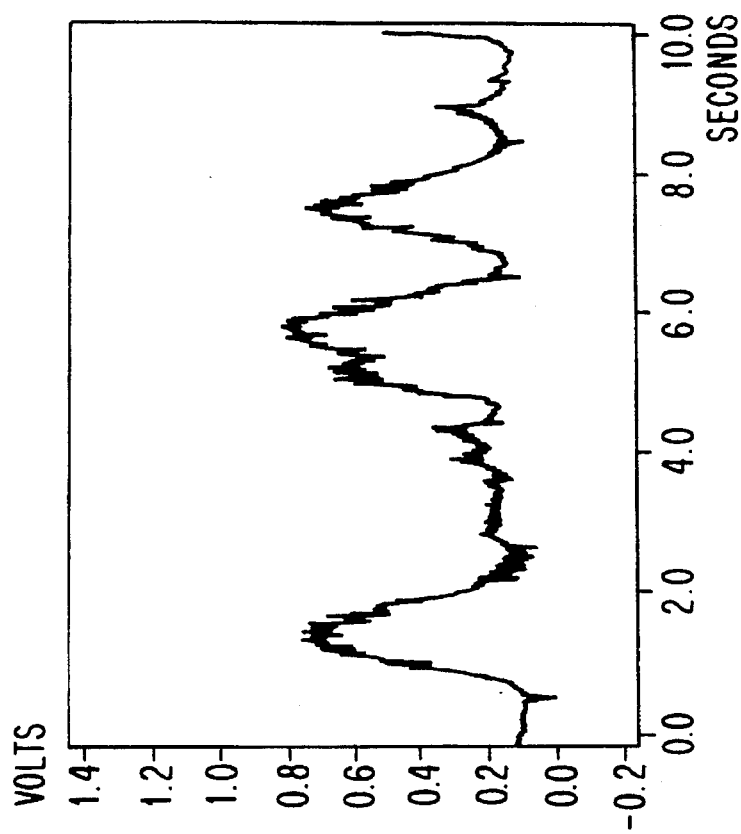
FIG.15

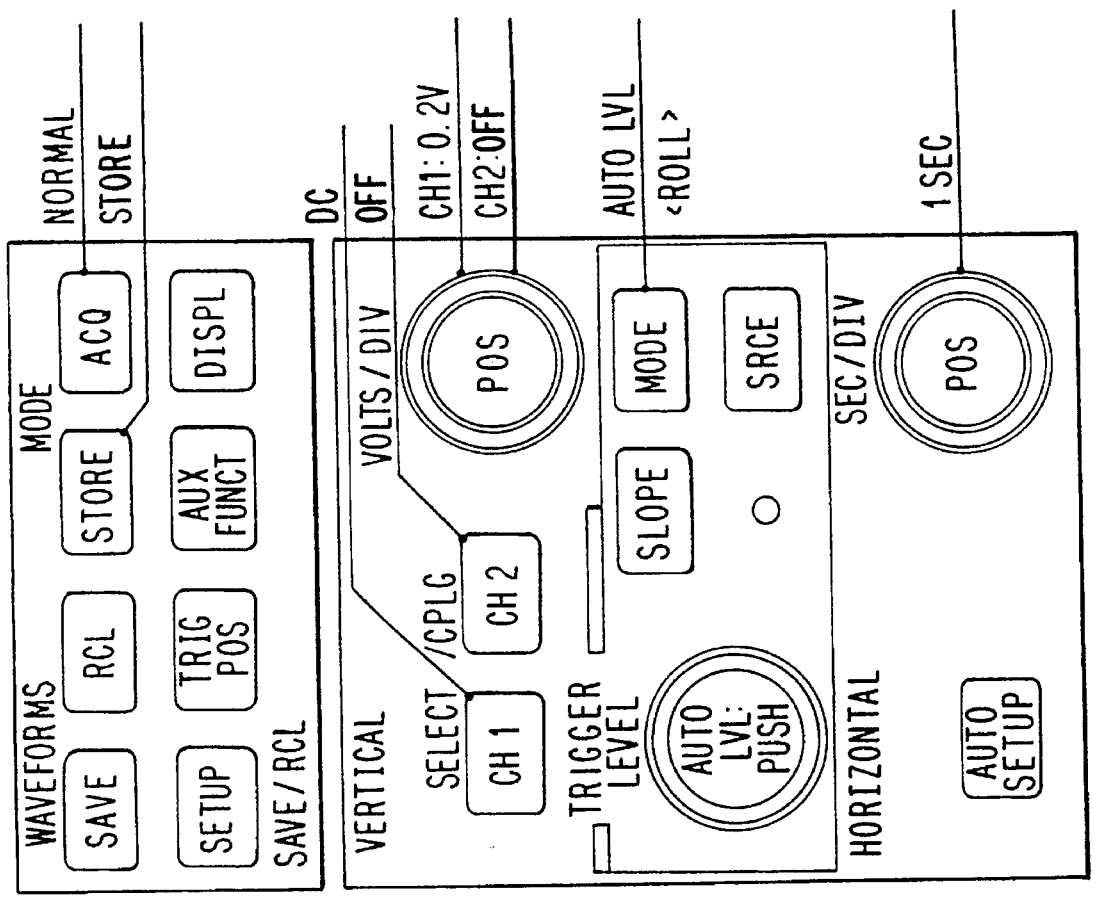
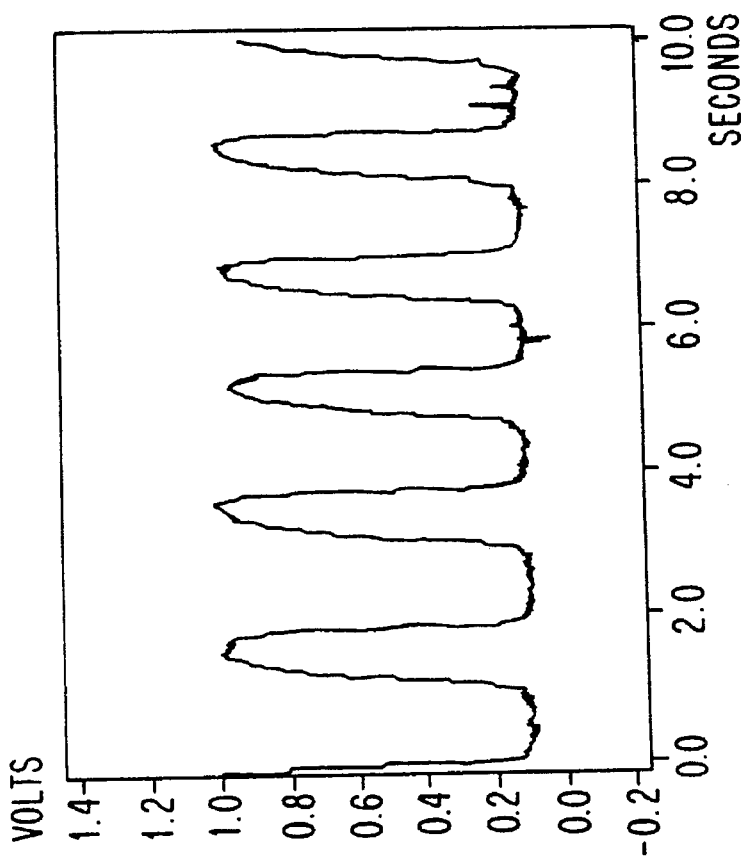
FIG. 16

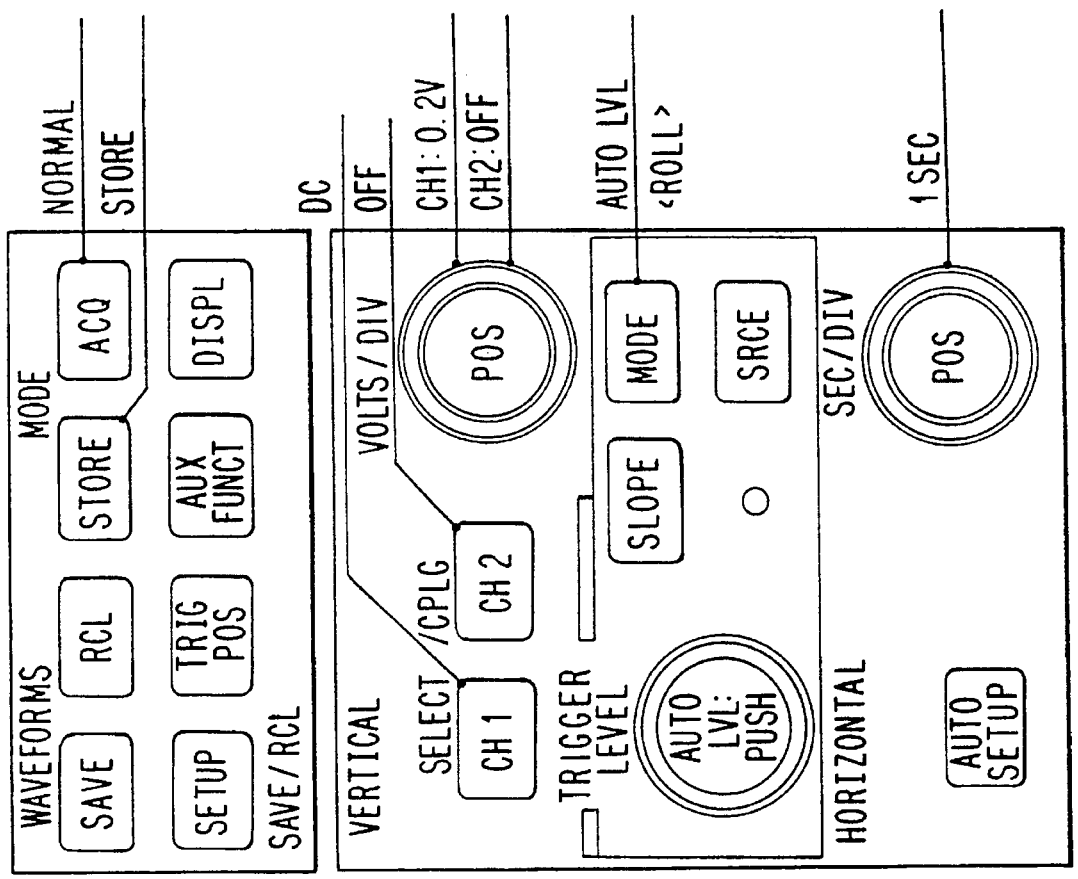
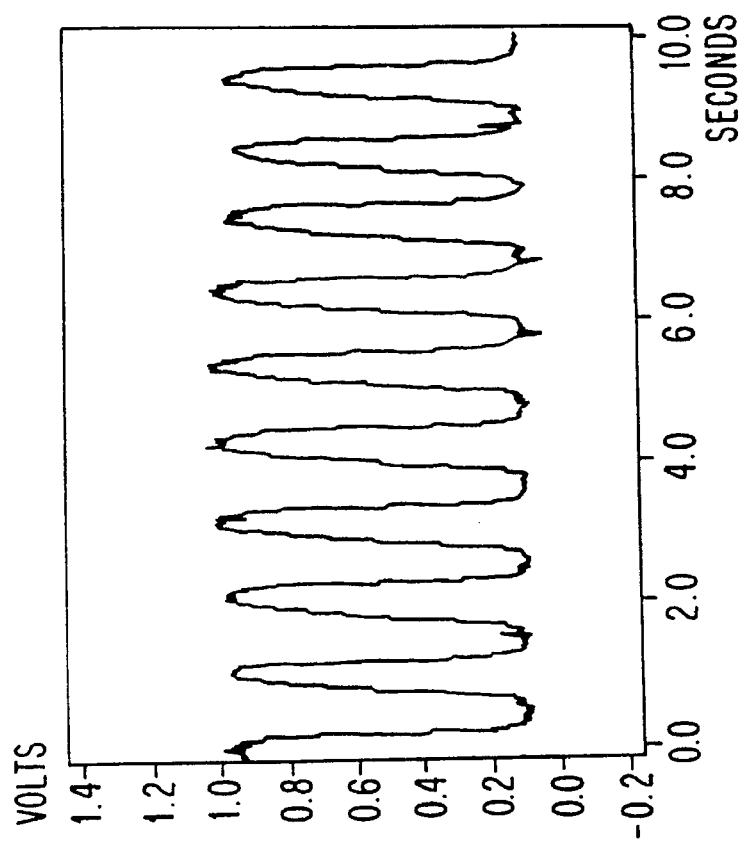
FIG. 17

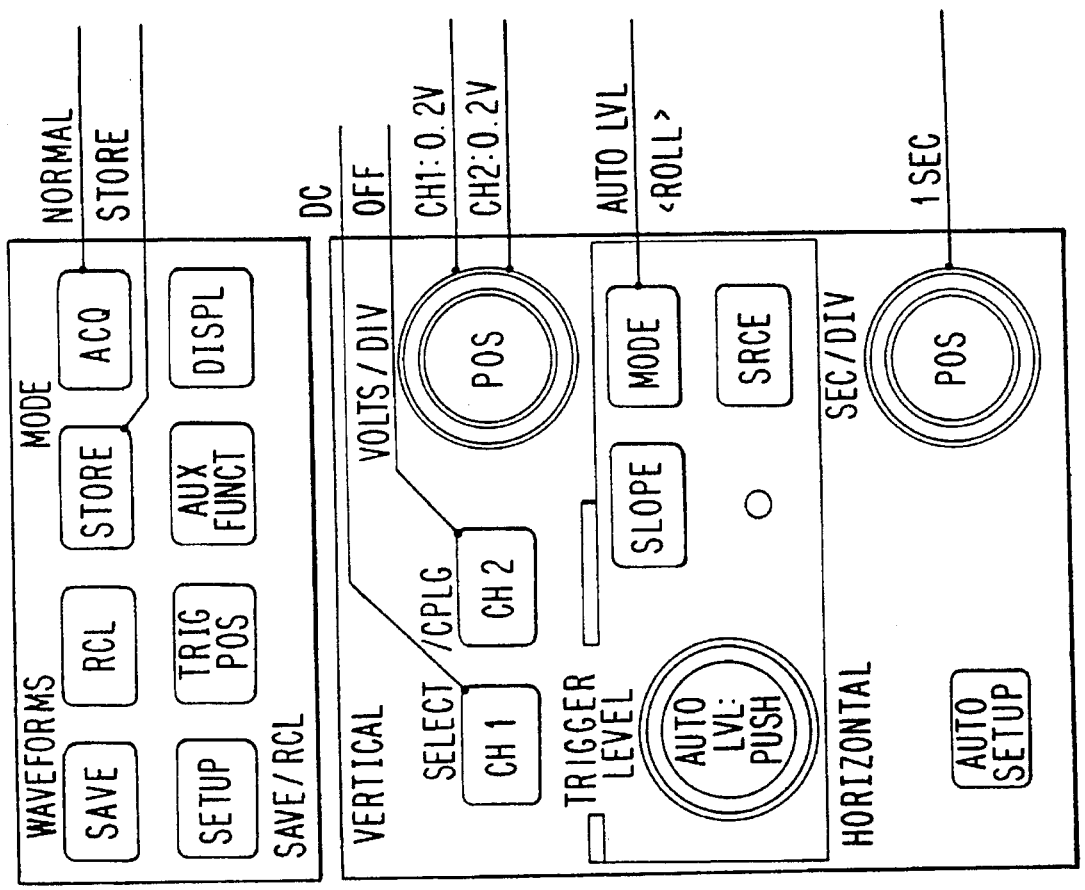
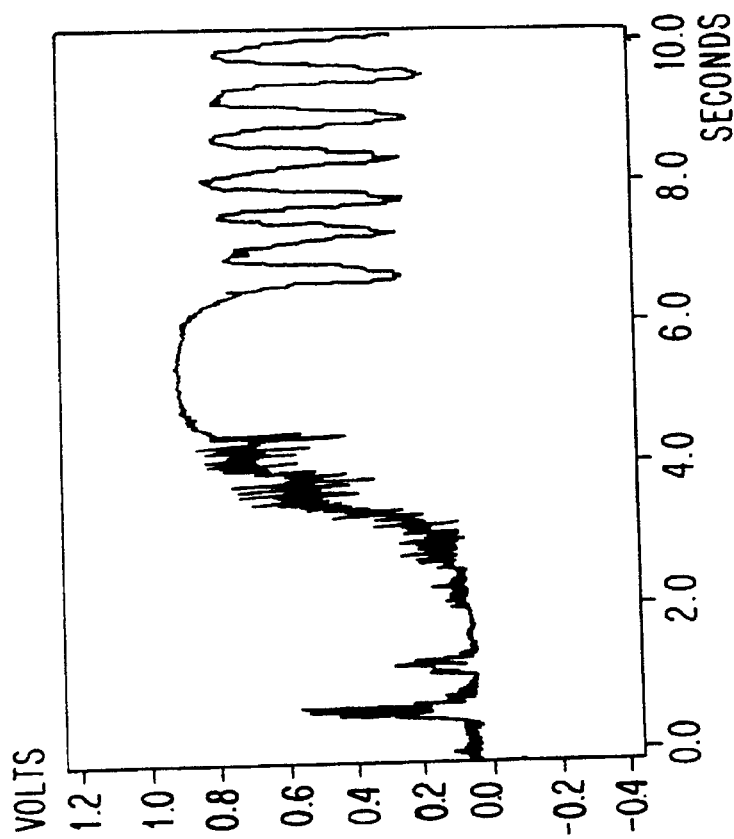
FIG.18

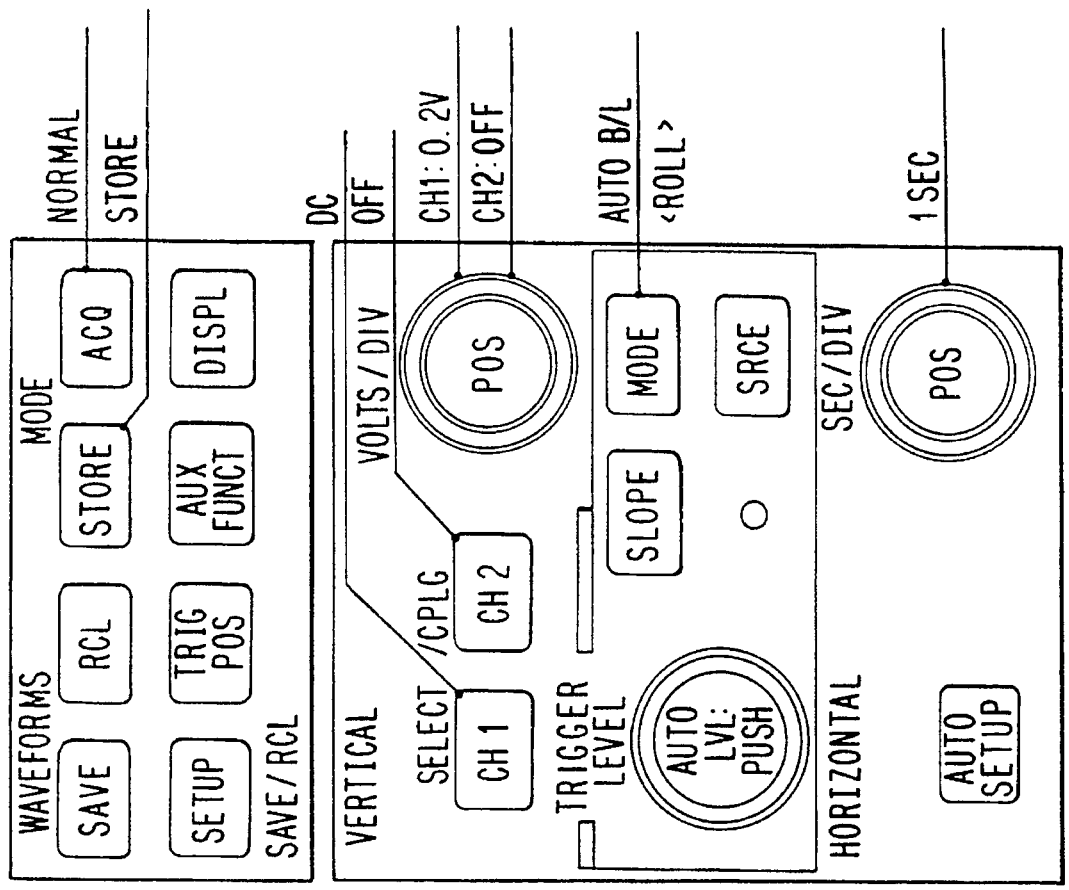
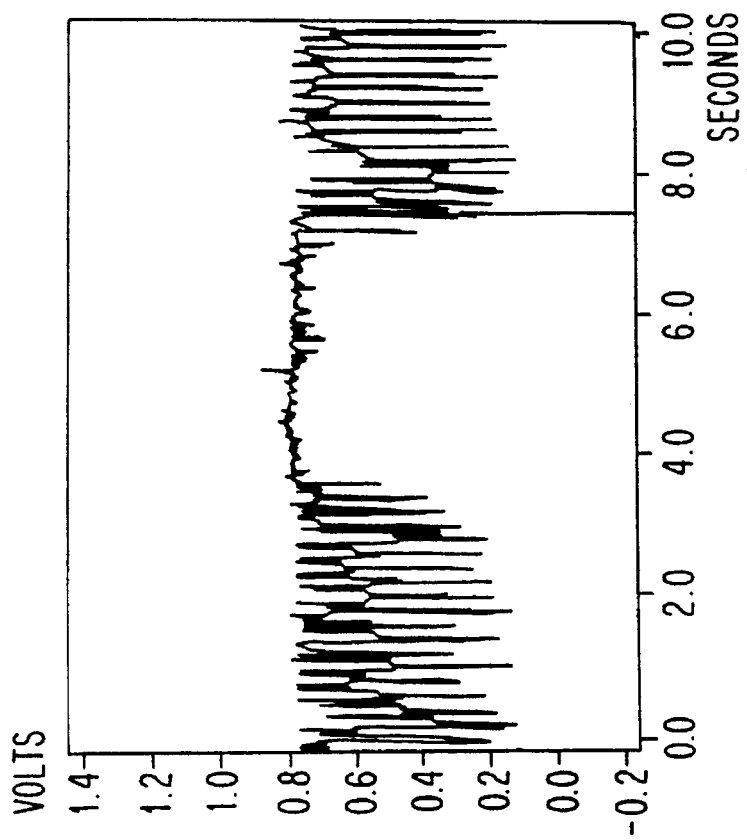
FIG. 19

INSTRUCTIONS

Use the mouse or the up or down arrow keys to select the means by which you wish to search for the waveform you want to see.

Then click the left mouse button or hit the 'Enter' key.

VIN code to search for?

Enter as many characters as you like of the VIN code you wish to search for, with a minimum of 3. Use the backspace key to make corrections. Then click the left mouse button or hit the 'Enter' key.

To return to the previous menu, click the right mouse button or hit the 'Esc' key.

FIG. 20B

FIG. 20C

VIN code to searc

1FTCR10TXLUXXXXX
1FTCR10TXLUXXXXX
1FTCR10TXLUXXXXX
1FTCR10TXLUXXXXX
1FTCR10TXLUXXXXX
1FTCR10TXLUXXXXX
1FTCR10TXLUXXXXX
1FTCR10TXLUXXXXX
1FTCR10TXLUXXXXX
1G4CW69B7G1XXXXXX
1G6CD5184H4XXXXXX
1G6CD5184H4XXXXXX
1G6CD5184H4XXXXXX
1G6CD5184H4XXXXXX
1JCMR7827JTXXXXXX

Enter as many cha
wish to search
backspace key
left mouse but the VIN code you
f 3.  Use the
Then click the
key.

To return to the
button or hit he right mouse

1FTCR10TXLUXXXXX

| 1990 | Ford | Ranger Pickup | 2.9L V-6 | MPFI | KOER | Hot |

Vehicle Speed Sensor                      07-27-92  12:27

Logged while driving 30 MPH

Select the waveform you wish to display by using the mouse or the up-arrow,
down-arrow, 'PgUp' or 'PgDn' keys.  Then click the left mouse button
or hit 'Enter.'

To return to previous screen, click the right mouse button or hit 'Esc.'

INSTRUCTIONS

Use the mouse or the up or down arrow keys to select the means by which you wish to search for the waveform you want to see.

Then click the left mouse button or hit the 'Enter' key.

```
Select by VIN
Select by Test Point
Select by Make
Return to main menu
```

Figure 21A:
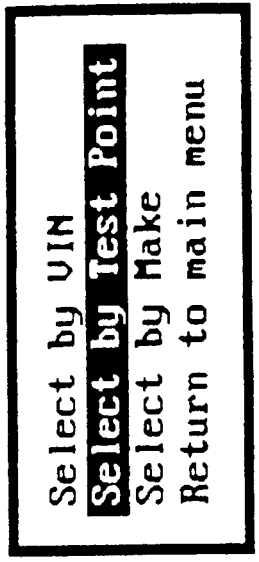
Figure 21B:
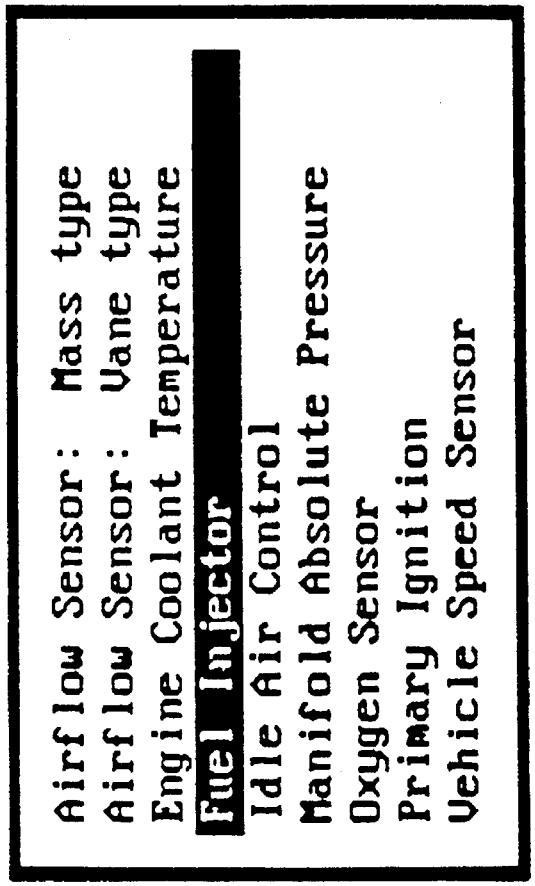
Figure 22A:
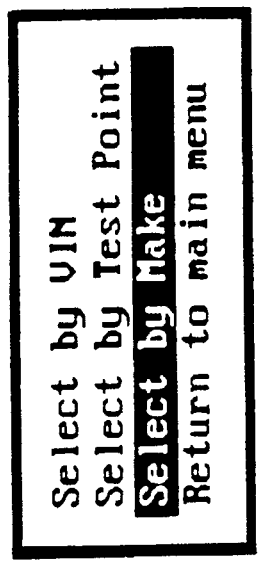
Figure 22B:
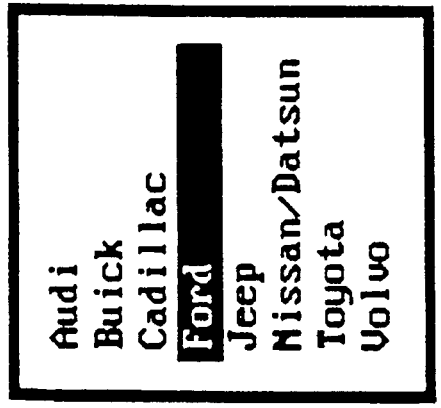

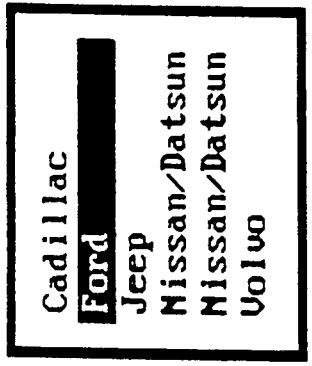
FIG. 21C

INSTRUCTIONS

Use the mouse or the up or down arrow keys to select the means by which you wish to search for the waveform you want to see.

Then click the left mouse button or hit the 'Enter' key.

Ford

Select the make in which you are interested by using the mouse or the up-arrow, down-arrow, 'PgUp' or 'PgDn' keys. Then click the left mouse button or hit 'Enter.'

To return to previous menu, click the right mouse button or hit 'Esc.'

FIG. 22C

Ford

Engine Coolant Temperature
Engine Coolant Temperature
Fuel Injector
Idle Air Control
Manifold Absolute Pressure
Oxygen Sensor
Primary Ignition
Vehicle Speed Sensor
Vehicle Speed Sensor

| 1990 | Ford | Ranger Pickup | 2.9L V-6 | MPFI | KOER | Warm |

Engine Coolant Temperature 07-28-92  07:47

Generic coolant temperature sensor

Select the waveform you wish to display by using the mouse or the up-arrow, down-arrow, 'PgUp' or 'PgDn' keys. Then click the left mouse button or hit 'Enter.'

To return to previous screen, click the right mouse button or hit 'Esc.'

METHOD AND APPARATUS FOR DIAGNOSING AUTOMOTIVE ENGINE PROBLEMS USING OXYGEN

This application is a continuation, of application Ser. No. 08/457,806, filed Jun. 1, 1995, now abandoned, which is a continuation of U.S. Ser. No. 266,166 filed Jun. 27, 1994 Abandoned and U.S. Ser. No. 973,792 filed Nov. 9, 1992 (abandoned).

1. BACKGROUND OF THE INVENTION

The invention relates generally to a convenient system and method for efficient diagnosis and servicing of engine system problems in automobiles and other vehicles that employ feedback-loop engine management computer systems. The system and method take advantage in a novel way of the characteristic electronic "signatures" that are generated by various components of an engine management computer system, particularly the oxygen sensor that monitors oxygen levels in engine exhaust gases. In addition, the system and method advantageously permit efficient and reliable detection of malfunctioning oxygen sensors, reducing the likelihood that a properly functioning sensor or other component will be wastefully replaced for lack of correct diagnostic information. The method has a wide application in that it may be utilized with many if not all vehicles which possess oxygen sensor feedback-loop engine control systems.

1.1. Vehicle Oxygen Sensors

As is well known to those of ordinary skill in the field of servicing computer controlled vehicle engines oxygen sensors (depicted in FIG. 1 by reference numeral 101) are commonly built into modem vehicle exhaust systems to monitor engine exhaust gases. As the air-fuel mixture ratio introduced into the engine cylinders changes, the quantity of oxygen ($O_2$) in the exhaust changes. The oxygen sensor 101 emits a voltage which is related to the amount of oxygen in the exhaust and the specific design of the sensor.

Several types of oxygen sensors are currently used in computerized vehicle emission control systems. Zirconium dioxide sensors, commonly known as zirconia sensors, are perhaps the most common and are found with and without heating elements. Zirconia sensors generate a voltage when heated by exhaust gases in an oxygen-deficient atmosphere. These sensors have a nominal electrical output that typically ranges from zero to one volt, dependent on the oxygen content of the exhaust. More recently, titanium based sensors have been employed for essentially the same purpose as their zirconia predecessors, except that as the $O_2$ level changes, the resistance across the sensor changes. When a reference voltage is applied to the sensor, the sensor returns a voltage to the computer which is directly related to the $O_2$ level in the exhaust.

1.2. Variation of Fuel-Air Mixture for Efficient Catalytic Conversion

The primary use of $O_2$ sensor information by vehicle engine management computer systems is in stoichiometric control of the fuel-air mixture introduced into the engine cylinders to aid catalytic conversion of the engine exhaust gases. The catalyst in most catalytic converters works most efficiently and lasts longer when subjected to a slight excess of air, followed by a slight excess of fuel, and so forth, as opposed to being subjected to a predominantly, non-oscillating mixture. Accordingly, the engine management computer system (sometimes referred to as an engine control module or ECM, identified in FIG. 1 by reference numeral 103) generates control signals to devices which alter the fuel-air mixture, e.g., fuel injectors. More specifically, the ECM 103 receives a voltage signal from the oxygen sensor 101 via an oxygen sensor lead 110. As noted above, that voltage is a function of the oxygen content of engine exhaust gases. The ECM 103 utilizes the voltage signal to vary the fuel-air mixture injected into the cylinders.

1.3. The Problem of Servicing Malfunctioning $O_2$ Sensors

Plainly, an ECM cannot optimally control its engine's fuel-air mixture if the $O_2$ sensor is malfunctioning. The Environmental Protection Agency (EPA) has stated that a large portion of engine emissions-test failures (i.e., engines that produce excessive pollutants) are due to malfunctioning oxygen sensors, by some estimates up to 50% of such failures.

In the field of vehicle servicing, however, no feasible or economical test is known to exist for determining whether an oxygen sensor is in fact malfunctioning. As a result, unnecessary replacement of oxygen sensors and other parts frequently occurs because of erroneous diagnosis and/or guesswork on the part of mechanics. It has been reported by oxygen sensor manufacturers that a large portion of all supposedly defective oxygen sensors that are returned to the manufacturer under warranty are in fact not defective.

Part of this diagnosis problem arises from the ECM's variation of the fuel-air mixture. Typically, an efficient predominantly fuel-air mixture results in an oxygen sensor output voltage averaging about 0.45 volts. By the same token, an efficient oscillating mixture likewise has an average voltage of about 0.45 volts. Use of a conventional volt-ohm meter (VOM), whether analog or digital (DVOM), cannot easily detect oxygen sensor problems because their sampling rates and averaging circuits do not give accurate representations of voltage vs. time. Due to the same limitations, scan tools are also inadequate.

2. SUMMARY OF THE INVENTION

A novel method in accordance with the invention for generating diagnostic signals for power plants (e.g., automobile engines and other internal combustion engines, gas turbines, and the like) utilizes a digital storage lab oscilloscope (DSO), configured to display at least about five seconds of data at about at least 50 data points per second, to capture specific power plant information primarily from an oxygen sensor. A preliminary "waveform" (graph of the deviation of an electrical signal including amplitude samples taken at about evenly spaced time intervals, stored in a digital memory and optionally displayed on a cathode ray tube) analysis verifies that the oxygen sensor is functioning correctly. Then, the oxygen-sensor waveform is classified as to certain primary characteristics to produce gross-level diagnostic information. If necessary, the injector waveform can be used to further classify system or mechanical malfunctions. More specific diagnostic information is obtained by classifying certain secondary characteristics of the waveform.

In some embodiments a portable DSO may be used to provide a low-cost way for a technician to connect the scope to a vehicle and actually drive the vehicle under varying conditions, thus increasing the chances of detecting and diagnosing intermittent problems. Such an approach is both more convenient and more economical than the use of expensive treadmill-type chassis dynamometers. The portability of the DSO also permits technicians to take the test equipment to various cars located in different repair bays instead of moving cars around to a fixed test instrument.

In another aspect of the invention, a portable computer is used to digitize, store, and display reference information, notably model waveforms for various types of oxygen sensors and other components. In still another aspect, a computer (portable or otherwise) can be used for automatic analysis and classification of individual engine waveforms.

3. BRIEF DESCRIPTION OF THE DRAWINGS

FIG. 1 is a general block diagram which demonstrates both how an engine control feedback-loop operates and is tested. The engine control module (ECM) 103 receives a signal from the oxygen sensor 101. This signal is then used to regulate the air-fuel ratio control devices 105. Examples of devices 105 are fuel injectors and other mixture control devices. Other inputs to the ECM 103 could include engine temperature, exhaust-gas temperature and engine speed. Examples of other outputs from the ECM 103 would include ignition timing exhaust gas recirculation (EGR).

Figure 2:
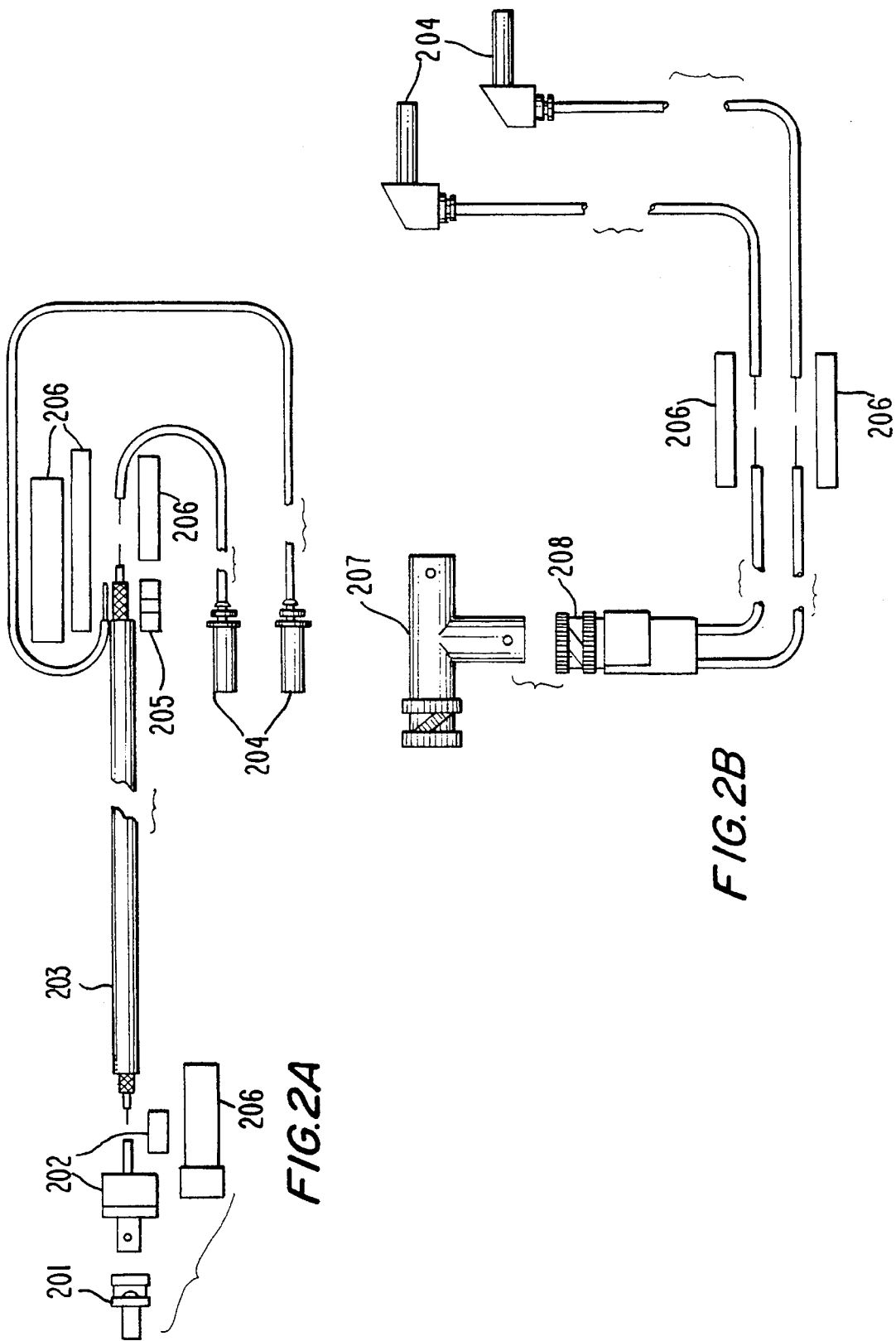

FIG. 2 illustrates two test leads which may be utilized to aid in displaying and measuring the signals from various sensors. The test leads are especially designed to withstand both the extreme heat and hazardous moving parts encountered in a vehicle's engine compartment.

Figure 3:
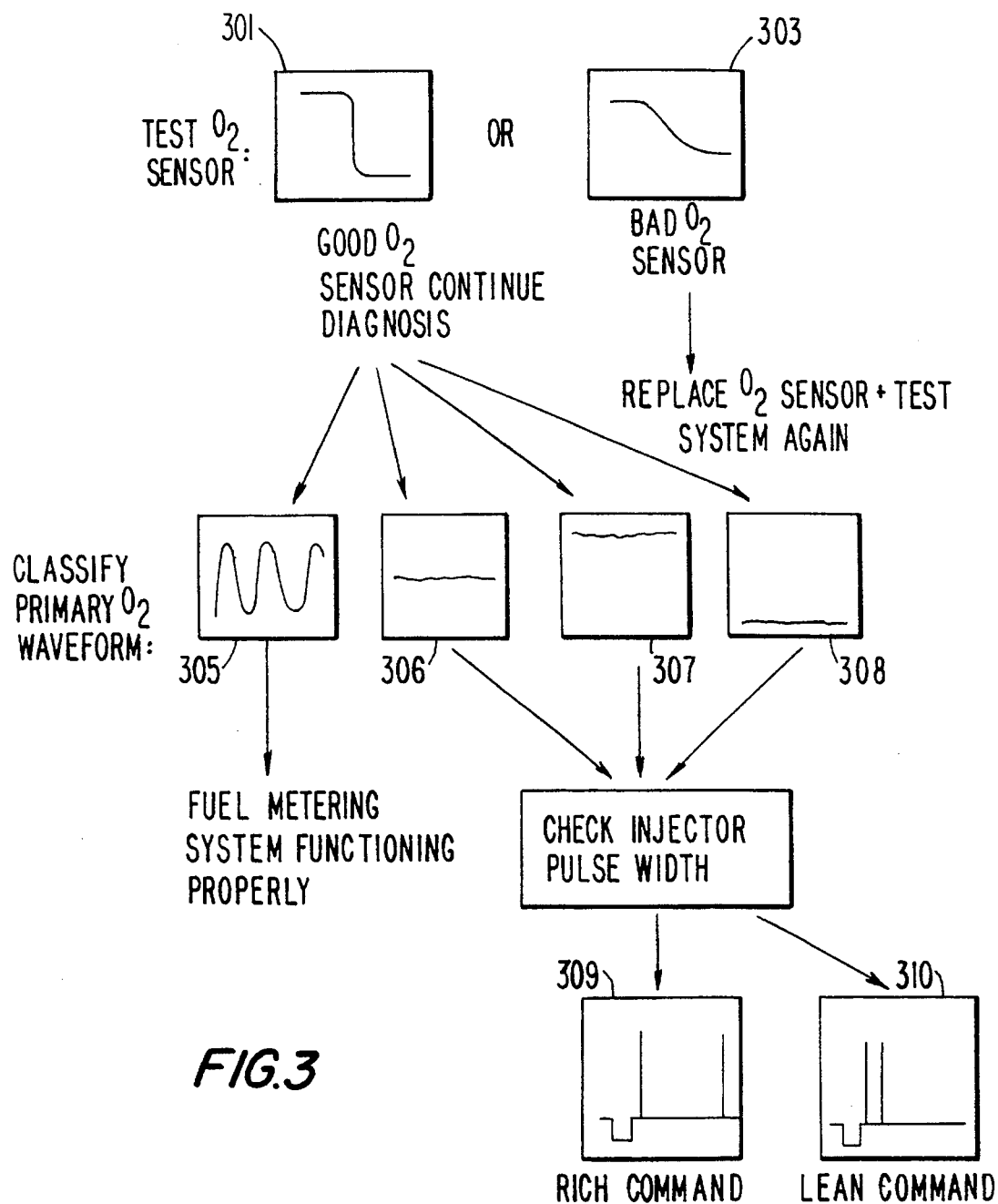

FIG. 3 depicts the waveforms 301 and 303 generated by testing the oxygen sensor. Waveforms 305–308 represent the waveforms generated when measuring the oxygen sensor's output during normal operation. Depending upon the waveform displayed, further diagnosis of the engine problems can be conducted.

FIGS. 4A, 4B, 5–10, and 12–19 are computer screen-dump printouts of actual digitized signal trace information including comments (some of which may have been edited for use here) logged by technicians operating an illustrative system in accordance with the invention. Print-outs that include an XXXX string of characters above the trace are from tests of specific vehicles where the XXXX strings serve to redact portions of the VIN (Vehicle Identification Number).

FIG. 11 is a decision table illustrating an aspect of a diagnostic technique in accordance with the invention.

FIGS. 20A, 20B, 20C, 21A, 21B, 21C, 22A, 22B, & 22C illustrate a menu-driven search tree for locating desired reference information, e.g., reference waveform images.

4. DETAILED DESCRIPTION OF SPECIFIC EMBODIMENTS

4.1. Digital Storage Lab Oscilloscope

Referring to FIG. 1, the illustrative system utilizes a hand-held digital storage lab oscilloscope (DSO) 111. In roll mode (in which the DSO continuously paints a signal trace on its display screen, with the oldest portion of the signal rolling off, e.g., the left side while the new data appears on the right side), the DSO is capable of displaying at least about ten seconds of data continuously scrolling across its display screen. One example of such an oscilloscope is the Tektronix 222X Series distributed by the Tektronix company of Beaverton, Oreg. Such an oscilloscope possesses sufficient accuracy and screen update rate to record the oxygen sensor's rapid voltage output changes as the ECM 103 varies the fuel-air mixture. Several nonportable brands and models are also capable of displaying this measured data; while they can be used in a system in accordance with the invention, their lack of portability will eliminate some of the advantages of a portable system.

4.2. Connector Cable

Two problems commonly arising in vehicle repair facilities and especially in working in a vehicle's engine compartment, are engine heat and interference with access by engine components. One aspect of the illustrative system involves the use of a connector cable, connecting the oxygen sensor to the oscilloscope, the design of which advantageously addresses those problems.

Referring to FIGS. 1 and 2, a connector cable 113 has two variations. Both versions comprise a teflon-coated coaxial cable 203 whose insulation is capable of withstanding the heat encountered in an engine compartment. The cable 203 also has a limited amount of bend to reduce both fatigue and the normal sagging of test cables which allows them to contact moving or hot engine parts. It has been found that a suitable high temperature coaxial cable is the RG-400/U teflon-coated cable available from Pasternack Industries in Irvine, Calif. under part number RG-400/U.

For test lead 1, shown in FIG. 2, a probe-tip-to-BNC adapter 201 is slipped on the probe tip of the oscilloscope 111 to provide a quick disconnect capability, thus helping protect both the equipment and the technician should the cable get caught in the fan blades of the engine, for example. The BNC adapter 201 is connected to a modified BNC cable end 202, which is then attached to the cable 203. At the other end of the cable 203 is a silicone insulated test lead with a sheathed male banana-plug connector 204. The test leads 204 are connected to cable 203 with a solder sleeve shield. All connections between the cables and test leads are covered with an adhesive lined heat shrink tubing 206. The tubing 206 helps in strain relief and preventing breakage at the connections.

Test lead 2 allows the technician to measure a signal's frequency with a multi-meter while the waveform is displayed on the oscilloscope 111. At one end of the test lead is a BNC tee connector 207 which is connected to a breakout BNC male connector 208. The other end of test lead 2 is comprised of silicone insulated test leads with sheathed male banana plugs 204. The connections between the test leads are covered with an adhesive lined heat shrink tubing 206.

4.3. Overview of Diagnostic Use of the Oscilloscope

In roll mode, the oscilloscope 111 permits the user, e.g., a service technician, to observe a signal's history to discern trends generated by the oxygen sensor 101. FIG. 3 is a high-level flow chart of diagnostic steps that can be taken using the scope as explained in more detail below.

4.4. Test of Oxygen Sensor Function

As shown in block 301 of FIG. 3, an optional first step in testing an engine with the system is that of testing whether the oxygen sensor 101 itself is functioning properly. Once such initial testing has verified that the sensor 101 is operating within its proper parameters, the sensor's output can be used to verify the functionality of the engine's feedback loop system. Ideally, to confirm that an oxygen sensor is functioning properly the following parameters should be measured:

1) Activation time: the time the oxygen sensor takes to reach its full level of activity from the initial start up of the engine;

2) Amplitude, i.e., the maximum and minimum voltages the sensor can obtain;

3) Response time: the minimum amount of time it takes the sensor to transit from its lowest to its highest voltage and vice versa. This time interval is not necessarily the same for both transitions; and 4) Cool down time: the time it takes the signal to degrade after the engine load is reduced from part throttle to idle.

Activation time is an area of diagnosis that is not specifically tested here. In most cases, activation time is primarily a function of the vehicle manufacturer's system design. Failure of the heating element contained within heated sensors has a significant negative effect on some systems. While artificially failing the heating element can allow a perceptive technician to note an unusually long time period from initial engine operating to the point of full oxygen sensor activity, actual diagnosis of the cause of failure is usually adequately addressed by the manufacturer.

Amplitude can be tested with the following steps for the typical zirconia oxygen sensor 101. The engine is fully warmed up, e.g., by holding it at about 2500 rpm for about two minutes, then reduced to idle speed for at least 30 seconds. The negative probe of the oscilloscope 111 is connected to ground, e.g., the engine block or the negative battery post. The positive probe of the oscilloscope 111 is connected to the oxygen sensor lead 110 using the connector 113.

The fuel-air mixture is forced to a lean level. This may be accomplished by creating a significant vacuum leak in the intake manifold, e.g., by disconnecting the positive crankcase ventilation (PCV) hose from the PCV valve or by removing a vacuum line from, e.g., a power brake booster reservoir. The forced lean mixture causes the oxygen sensor voltage to drop to its minimum level (or in some systems to rise to its maximum level).

When the lean condition has been established, the fuel-air mixture is forced to a rich level. This may be accomplished by feeding additional fuel (e.g., propane) to the mixture via the previous vacuum leak, e.g., (PCV) hose or via a vacuum port such as the power brake booster hose. The amount of fuel delivered is gradually increased until engine RPM is noticeably reduced. The voltage should then rise to its maximum level (or drop to its minimum level).

Response time can be measured by rapidly alternating between the injection of fuel into the induced vacuum leak and the removal of the same. The scope trace shows the transit time from full rich to full lean and vice versa. A typical zirconia sensor, when properly functioning, will exhibit a volts-to-time pattern approximating a step wave form as illustrated in FIG. 4A. The trace begins at a time indicated in the Figure as approximately 0.0 seconds with the engine operating in the full rich condition, producing a voltage exceeding 0.8 volts. At about 6.2 seconds the fuel enrichment is terminated simultaneously with the introduction of excess air; the sensor should accurately track this event with a vertical drop of sufficient speed that the middle third of the drop is approximately vertical, i.e., the middle third of the transition from maximum to minimum voltage occurs in no more than about 0.1 second. At 6.6 seconds the trace displays a low voltage representative of the engine's lean condition.

Figure 4B:
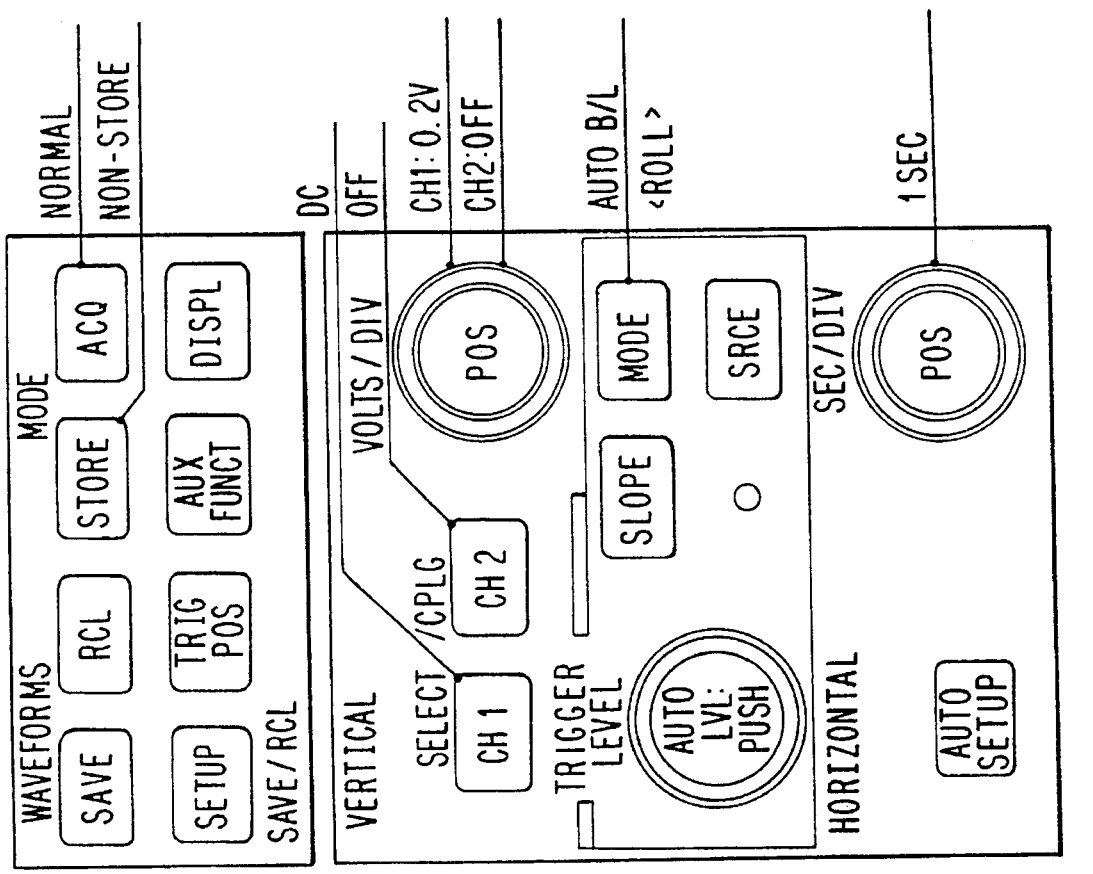

As shown in FIG. 4B, a malfunctioning oxygen sensor normally does not demonstrate the step wave shown in FIG. 4A. If a typical zirconia sensor's maximum measured voltage is less than about 0.8 volts, the sensor is not functioning properly. When the fuel-air mixture is suddenly forced lean at 5.2 seconds, approximately 5 seconds elapse before the sensor's output reaches zero volts.

Cool down time is tested by keeping the sensor active for a reasonable period of time when the engine is operating at idle speed. Because federal emissions tests have a maximum idle period of 40 seconds, a thirty-second wait between the time when the engine rpms are reduced to idle and the time that the sensor is exercised should be sufficient to establish that the oxygen sensor can meet the required parameters under the most severe conditions at which it is expected to be tested.

4.5. Classification of Primary Oxygen Sensor Waveforms

After the proper functioning of the oxygen sensor 101 has been verified, the waveform created by the oxygen sensor voltage signal can be used to distinguish between ECM-related problems (e.g., a malfunctioning computer system) and mechanical problems. Oscilloscope displays of specific irregular waveforms generated by the $O_2$ sensor can indicate a specific problem with the vehicle's fuel combustion. Each irregular waveform indicates a particular approach to the identity of the root problem.

Although the operating parameters of the various sensors vary with their design, it has been empirically determined that all the sensors tested exhibit typical waveform patterns for the same engine problem conditions. This allows the output of any sensor to be compared with a cataloged pattern for that sensor. Further, most sensors can be tested in a similar manner. Referring again to FIG. 3, four examples of specific waveforms are shown.

Waveform 305, shown in expanded form in FIG. 5, indicates a "normal" waveform i.e., normal operation of the combustion system and thus a properly varying fuel-air mixture. Because the average fuel-air mixture over time should produce an average voltage of 0.45 volts, the signal as displayed on the oscilloscope 111 should spend about as much time above 0.45 volts (indicating a rich mixture) as it does below that level (indicating a lean mixture). The number of transitions from rich to lean (cross-counts) will vary with, e.g., the system type (feedback carburetor, throttle-body injection (TBI), multi-port fuel injection (MPFI)) and engine RPM. Generally speaking, MPFI systems have the most cross-counts per second, followed by TBI and feedback carburetor systems. Hash or extra spikes on the signal display can indicate a vacuum leak, fuel pump cavitation, cylinder or injector imbalance, or misfire.

Waveform 306, shown in expanded form in FIG. 6, indicates a fuel-air mixture that apparently is not being controlled by the ECM, indicating a systems failure of some kind, e.g., a loss of oxygen-sensor signal to the ECM (perhaps via a bad lead 110) or a computer problem with the ECM itself. Waveform 307, shown in expanded form in FIG. 7, indicates a predominantly rich fuel-air mixture, while waveform 308, shown in expanded form in FIG. 8, indicates a predominantly lean fuel-air mixture.

4.6. Analysis of Fuel Metering Device Signals

A predominantly rich or -lean condition can be analyzed further by obtaining a waveform of the fuel injector (or other mixture control devices) with the oscilloscope 111 to analyze the signal of the fuel injection pulse. As shown in waveforms 309 and 310 (and in expanded form in FIGS. 9 and 10 respectively), a too-wide injector pulsewidth indicates that the ECM 103 is generating a command for a rich mixture, while a too-narrow injector pulsewidth indicates that the ECM is generating a command for a lean mixture. The table in FIG. 11 shows some possible causes for various combinations of rich- and lean-mixture commands from the ECM juxtaposed with oxygen-sensor signals indicating predominantly rich or predominantly lean actual conditions:

a. If the oxygen-sensor signal indicates a predominantly rich mixture but the injector pulsewidth indicates that the ECM is generating a lean command, a mechanical problem is indicated. Potential problems include a bad fuel pressure regulator causing too high a fuel pressure; a leaking or sticking injector; a bad purge system; and/or a clogged fuel return line.

b. If the oxygen-sensor signal indicates a predominantly rich mixture and the injector pulsewidth indicates that the ECM is generating a rich command, the ECM likely is receiving a spurious sensor input or the ECM is not functioning properly. For example, various temperature sensors might improperly indicate that the engine is not warmed up, causing the ECM to generate a rich mixture.

c. If the oxygen-sensor signal indicates a predominantly lean mixture but the injector pulsewidth indicates that the ECM is generating a lean command, a spurious sensor input or ECM failure is again indicated.

d. If the oxygen-sensor signal indicates a predominantly lean mixture and the injector pulsewidth indicates that the ECM is generating a rich command, mechanical problems are again indicated. Potential problems may include, e.g., a bad fuel pressure regulator delivering too little fuel pressure; a clogged fuel injector; or a bad fuel pump.

4.6. Analysis of Secondary Waveform Characteristics

Waveforms whose primary characteristics resemble those of waveforms 306, 308, or 309 will often exhibit secondary characteristics. Such secondary characteristics can show clearly recognizable forms attributable to specific combustion problems in one or more cylinders. Generally speaking, such combustion problems arise from either (1) failure to maintain consistent fuel mixtures in all the cylinders serving the oxygen sensor under test, or (2) ignition misfire or failure of ignition in one or more cylinders.

A number of specific examples of such problems are described below along with the signal patterns resulting therefrom. The respective problems and associated patterns are referred to in the claims below as being in a "DSO Problem/Pattern Relationship."

FIG. 12: Fuel charge imbalance, i.e., inconsistent fuel-air mixtures from cylinder to cylinder. One or more cylinders have a different fuel-air mixture than the other cylinders in the engine. As a result, oxygen sensor voltage transitions occur at a higher frequency than in a normal ECM control pattern; in effect, a higher-frequency signal is superimposed on the normal, lower-frequency ECM control pattern. Average voltage remains approximately normal.

FIG. 13: Dripping injector. A predominantly normal pattern includes a sudden vertical rise followed by a comparatively long period (e.g., approximately one second or more) in which the oxygen sensor voltage indicates a predominantly rich mixture, then followed in turn by a slowly decreasing level in response to ECM control attempts. Example: in FIG. 13, the sudden rise and high signal trace between 3.0 seconds and 4.0 seconds indicates a dripping injector, followed by a gradual decrease resulting from ECM corrective attempts. Average voltage is thus biased high.

Figure 14:
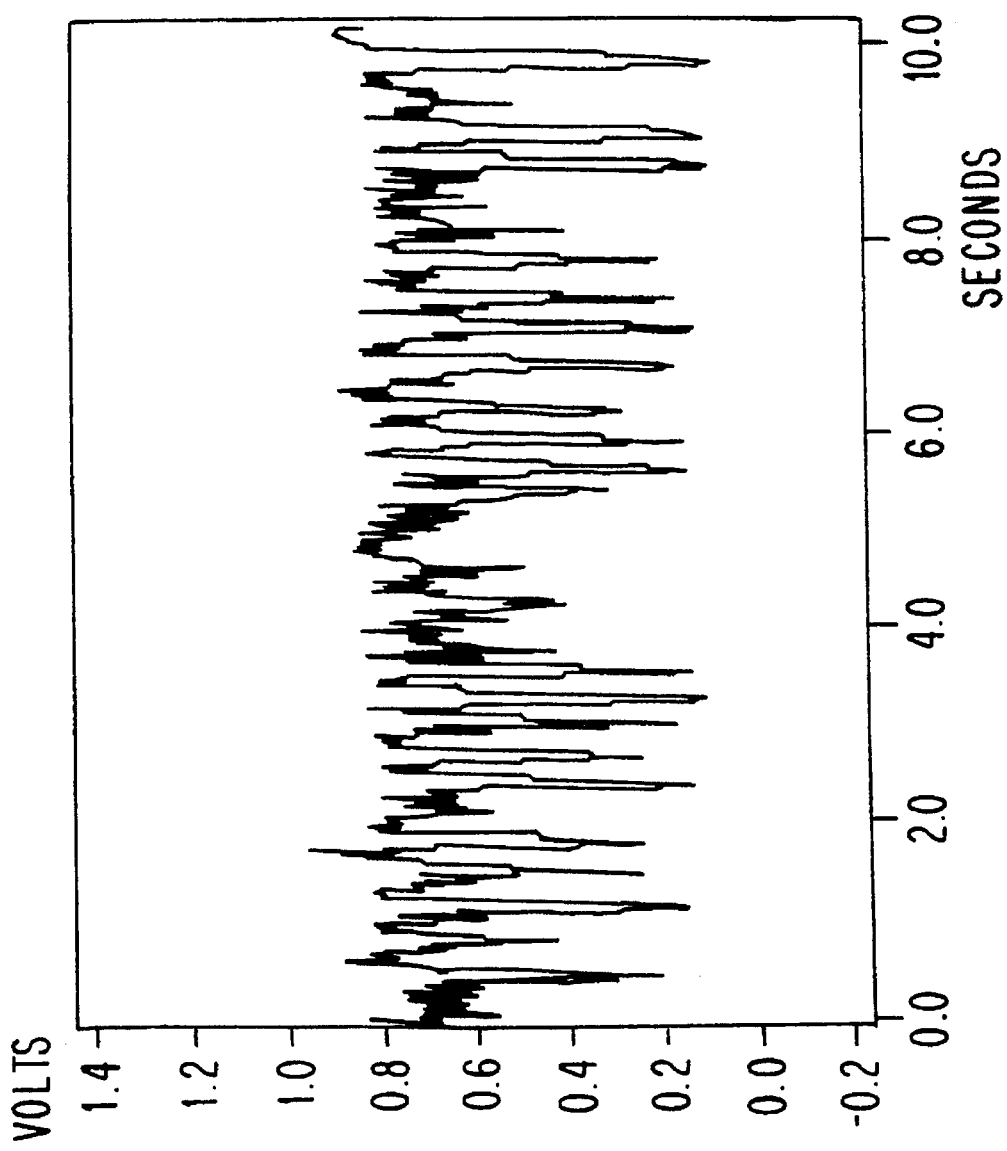
Figure 20A:
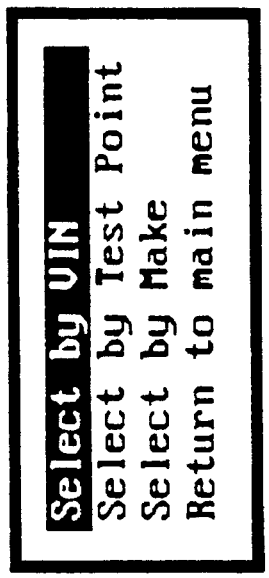

FIG. 14: Dripping injector at high engine RPM. Average voltage is predominantly high—the trace seldom reaches its minimum voltage and has large areas of space under the curve.

FIG. 15: Excess oxygen in exhaust stream. Even though the oxygen sensor's voltage continues to trace an approximately sinusoidal pattern throughout its full amplitude range, periods of predominantly low voltage (e.g., between about 2.0 seconds to about 4.5 seconds in the Figure) indicate excessive oxygen. Average voltage is thus biased low.

FIGS. 16 and 17: FIG. 16 shows a trace resulting from one nonfunctioning (in fact disconnected) injector at high speed, creating a predominantly lean trace with an average voltage biased low and with excessive dwell time at minimum voltage. FIG. 17 represents the same engine after repairing (or reconnecting) the injector.

FIG. 18: Fuel pump cavitation. The waveform initially indicates a lean mixture as discussed in connection with FIG. 15 during the first two seconds. From about 2.0 seconds to about 4.0 seconds, while the engine is running some of the injectors receive more fuel than others because of fuel pump cavitation, creating a pattern similar to FIG. 12 (fuel charge imbalance) inasmuch as all injectors have not received a full charge of fuel. At about 4.5 seconds the pump and injectors are fully charged with fuel; the voltage pattern indicates a full-rich condition, whereupon the ECM takes corrective action and restores normal operation at about 6.0 to 6.5 seconds.

FIG. 19: Vacuum leak in intake system indicated by very high-frequency signal at idle RPM. Fuel (carburetor cleaner) is sprayed on the intake system in the area around the leak, causing a rich indication at about 3.5 seconds and lasting until spraying is discontinued at about 7.0 seconds.

4.7. Computerized Storage and Display of Reference Information

In another aspect of the invention, a portable computer may be advantageously used for convenient storage and display of reference information such as model waveforms for specific types of oxygen sensor and other components. A Compaq LTE 25C notebook computer with a 120-megabyte hard disk drive and 8 megabytes of read-write memory (RAM) has been used satisfactorily, but any computer with adequate memory and disk storage space may be used. The computer may further be utilized for generating signals encoding digitized diagnostic information for particular vehicles such as the diagnostic information illustrated in the Figures, with vehicle being input to the computer via an RS-232 port on the DSO 111 and/or via manual means such as a keyboard; for generating customer reports; and so forth. The source code of an exemplar program for performing such functions is included in the enclosed appendix, which is incorporated herein by reference.

The computer may be programmed to store, retrieve, and display specific information in any convenient manner. It will be appreciated that the programming itself will be highly implementation-specific, but nevertheless a routine undertaking for a software developer of ordinary skill having the benefit of this disclosure. It has been found, however, that it is particularly advantageous for the programming to permit a technician to search for model waveforms via a tree-like index. An exemplar embodiment is illustrated in FIGS. 20A, 20B, 20C, 21A, 21B, 21C, 22A, 22B, & 22C. If the technician knows the vehicle identification number (VIN), the specific sensor for which information is desired (test point), or the make and model of the car, then the technician can begin traversing the search tree utilizing that information.

In another embodiment, the computer may be programmed to perform automatic waveform analysis and classification as described above, e.g., using known pattern-recognition techniques.

It will be appreciated by those of ordinary skill having the benefit of this disclosure that numerous variations from the foregoing illustration will be possible without departing from the inventive concept described herein. For example, the DSO and computer can be a single integrated test instrument, e.g., a computer with a data acquisition device and an appropriate display, e.g., a CRT, good/bad test result status lights, etc. As another example, functions described above as implemented in the software can equivalently be implemented in hardware and vice-versa. Accordingly, it is the claims set forth below, and not merely the foregoing illustration, which are intended to define the exclusive rights claimed in this application.

What is claimed is:

1. An oxygen sensor testing method of generating a diagnostic information signal indicative of a condition of an oxygen sensor in an engine having a feedback loop control system, said oxygen sensor generating an output signal, said method comprising the steps of:
   (a) configuring a digital storage lab oscilloscope (DSO) to have a display signal in a roll mode;
   (b) connecting said oxygen sensor output signal to an input of said DSO; and
   (c) operating the engine;
   (d) generating a repetitive waveform encoding the output of said oxygen sensor;
   (e) configuring the display to display a time period of at least 2.5 seconds of real time data in the horizontal direction;
   (f) and determining the condition of the oxygen sensor from said display.

2. An oxygen sensor testing method of generating a diagnostic information signal indicative of a condition of an oxygen sensor in an engine having a feedback loop control system according to claim 1, wherein said display is configured to display at least approximately five seconds of data.

3. An oxygen sensor testing method as claimed in claim 1, wherein said DSO comprises an algorithm requiring a minimum number of sample points per periodic time interval and a minimum time interval so as to provide a roll mode display on said DSO.

4. An oxygen sensor testing method as claimed in claim 3, wherein said minimum number of sample points is approximately fifty per second.

5. An oxygen sensor testing method as claimed in claim 3, wherein said minimum time interval is approximately five seconds.

6. A testing method as claimed in claim 1, wherein said DSO comprises an algorithm requiring to a minimum number of sample points per periodic time interval and a minimum time interval so as to provide a roll mode display on said DSO.

7. A testing method as claimed in claim 6, wherein said minimum number of sample points is approximately fifty per second.

8. A testing method as claimed in claim 7, wherein said minimum time interval is approximately five seconds.

9. An oxygen sensor testing method of generating diagnostic information signal indicative of a condition of an oxygen sensor in an engine having a feedback loop control system and generating diagnostic information about the operating conditions of said engine, said oxygen sensor generating an output signal, said method comprising the steps of:
   (a) configuring a data acquisition processing and digital storage means,
   (b) connecting said oxygen sensor output signal to an input of said data acquisition processing and digital means;
   (c) operating the engine;
   (d) generating a repetitive signal encoding the output of said oxygen sensor;
   (e) generating diagnostic information from said repetitive signal indicating detailed information about conditions in said engine from the output of said oxygen sensor.

10. An oxygen sensor testing method as in claim 9 further comprising the steps of determining whether said repetitive signal matches a model repetitive signal associated with a normally functioning engine, and if not, generating a signal encoding diagnostic information indicating the conditions in said engine.

11. A testing method as claimed in claim 9, further comprising means for loading said data storage means with predictive diagnostic information related to specific motors and means to compare the repetitive signal with the predictive diagnostic information to determine the operating conditions of the engine.

12. A testing method as in claim 9 wherein the step (c) of operating the engine includes the steps of
   (c)(1) warming up the engine, and
   (c)(2) running the engine at idle for a specified period of time.

13. A testing method as in claim 9 and further comprising the steps of determining whether said signal matches a model signal associated with a normally functioning oxygen sensor, and if not, generating a signal encoding diagnostic information indicating that said oxygen sensor is malfunctioning.

14. A testing method of generating diagnostic information about the operating conditions of an automobile engine, said automobile engine including an oxygen sensor generating an output signal, said method comprising the steps of:
   (a) configuring a digital storage lab oscilloscope (DSO) to display a signal in a roll mode;
   (b) connecting said oxygen sensor output signal to an input of said DSO; and
   (c) operating the engine;
   (d) generating a repetitive waveform encoding the output of said oxygen sensor displayed on said DSO;
   (e) and generating diagnostic information indicating information about conditions in said engine as displayed on said DSO.

15. A testing method as in claim 14 and further comprising the steps of: determining whether said waveform matches a model waveform associated with a normally functioning engine, and if not, generating a signal encoding diagnostic information about the condition of said engine.

16. A testing method as in claim 14, wherein said repetitive waveform comprises waveforms repeating at least three times.

17. A testing method as in claim 16, wherein each of said repetitive waveforms are not identical to the other of said waveforms.

18. A testing method as claimed in claim 14, wherein said DSO comprises an algorithm requiring to a minimum number of sample points per periodic time interval and a minimum time interval so as to provide a roll mode display on said DSO.

19. A testing method as claimed in claim 18, wherein said minimum number of sample points is approximately fifty per second.

20. A testing method as claimed in claim 19, wherein said minimum time interval is approximately five seconds.

21. A testing method as claimed in claim 14, further comprising data storage means, means for loading said data storage means with predictive diagnostic information related to specific motors and means to compare the repetitive waveform with the predictive diagnostic information to determine the operating conditions of the engine.

22. A method as in claim 14 wherein said conditions in said engine and said waveform are related to each other by a DSO Problem/Pattern Relationship.

* * * * *